United States Patent
Nishino et al.

(10) Patent No.: US 11,673,341 B2
(45) Date of Patent: Jun. 13, 2023

(54) POLYAMIDE RESIN COMPOSITION, MOLDED BODY THEREOF, AND METHOD FOR MANUFACTURING LASER-WELDED BODY

(71) Applicant: MITSUI CHEMICALS, INC., Tokyo (JP)

(72) Inventors: Kohei Nishino, Ichihara (JP); Yohei Hotani, Shanghai (CN); Isao Washio, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 291 days.

(21) Appl. No.: 16/970,011

(22) PCT Filed: Feb. 15, 2019

(86) PCT No.: PCT/JP2019/005694
§ 371 (c)(1),
(2) Date: Aug. 14, 2020

(87) PCT Pub. No.: WO2019/160117
PCT Pub. Date: Aug. 22, 2019

(65) Prior Publication Data
US 2021/0101347 A1    Apr. 8, 2021

(30) Foreign Application Priority Data

Feb. 16, 2018    (JP) .............................. JP2018-026310

(51) Int. Cl.
| | | |
|---|---|---|
| B29C 65/16 | (2006.01) |
| C08K 3/013 | (2018.01) |
| B29C 65/00 | (2006.01) |
| B32B 27/08 | (2006.01) |
| B32B 27/34 | (2006.01) |
| C08G 69/26 | (2006.01) |
| C08K 7/14 | (2006.01) |
| C08L 77/06 | (2006.01) |

(52) U.S. Cl.
CPC ...... *B29C 65/1635* (2013.01); *B29C 66/1122* (2013.01); *B29C 66/71* (2013.01); *B32B 27/08* (2013.01); *B32B 27/34* (2013.01); *C08G 69/265* (2013.01); *C08K 3/013* (2018.01); *C08K 7/14* (2013.01); *C08L 77/06* (2013.01); *B32B 2250/02* (2013.01); *B32B 2250/24* (2013.01); *C08L 2205/025* (2013.01)

(58) Field of Classification Search
CPC ........................... C08L 2666/72; C08K 3/013
See application file for complete search history.

(56) References Cited

U.S. PATENT DOCUMENTS

| | | |
|---|---|---|
| 5,378,800 A | 1/1995 | Mok et al. |
| 2004/0045663 A1 | 3/2004 | Katayama et al. |
| 2017/0022349 A1 | 1/2017 | Mii et al. |

FOREIGN PATENT DOCUMENTS

| | | |
|---|---|---|
| JP | 2004148800 A | 5/2004 |
| JP | 2006273992 A | 10/2006 |
| JP | 2008266434 A | 11/2008 |
| JP | 2011063795 A | 3/2011 |
| JP | 2015058608 A | 3/2015 |
| WO | 03085029 A1 | 10/2003 |
| WO | 2015/159834 A1 | 10/2015 |
| WO | 2017/191269 A1 | 11/2017 |

OTHER PUBLICATIONS

English machine translation of JP2008266434 (Year: 2008).*
English machine translation of JP2011063759 (Year: 2011).*
International Search Report (PCT/ISA/210) and an English translation thereof, and Written Opinion (PCT/ISA/237) dated May 14, 2019, by the Japanese Patent Office as the International Searching Authority for International Application No. PCT/JP2019/005694.

* cited by examiner

*Primary Examiner* — Ana L. Woodward
(74) *Attorney, Agent, or Firm* — Buchanan, Ingersoll & Rooney PC

(57) ABSTRACT

This polyamide resin composition contains: 30-89.9 parts by mass of a polyamide resin (A) having a melting point of at least 300° C.; 0-45 parts by mass of a polyamide resin (B) having substantially no melting point; 0.1-5 parts by mass of a light-transmitting pigment (C); and 10-55 parts by mass of a fibrous filler (D) (the total amount of (A), (B), (C), and (D) is 100 parts by mass). The polyamide resin (A) contains at least a terephthalic acid-derived component unit. In a molded body of the polyamide resin composition, the corrected heat of fusion (ΔHR) is 10-70 J/g, and the transmittance of laser light having a wavelength of 940 nm is at least 15% at a thickness of 1.6 mm.

14 Claims, 1 Drawing Sheet

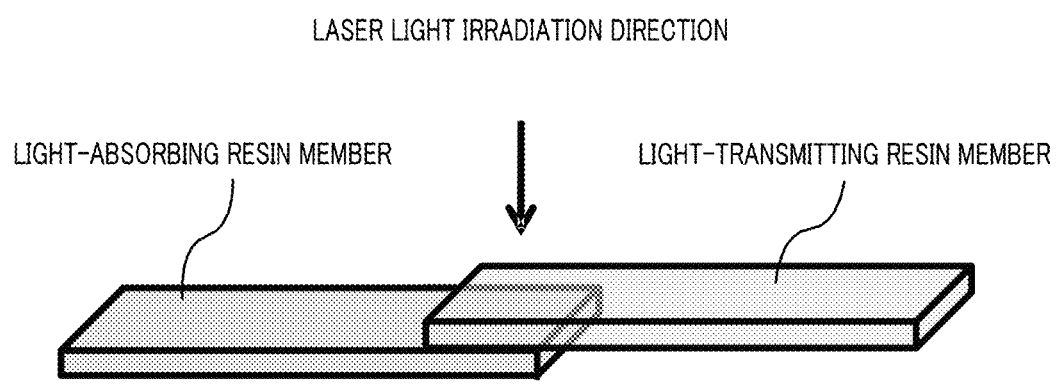

POLYAMIDE RESIN COMPOSITION, MOLDED BODY THEREOF, AND METHOD FOR MANUFACTURING LASER-WELDED BODY

TECHNICAL FIELD

The present invention relates to a polyamide resin composition, a molded body thereof, and a method for manufacturing a laser-welded body.

BACKGROUND ART

A laser welding method is known as one of the methods for joining thermoplastic resin components to each other. Features of the laser welding method are that welding is possible without having a laser light-generating section to come into contact with a site to be welded, that the peripheral portions are little affected by heat due to local heating, that there is no risk of mechanical vibrations, that components having fine features and three-dimensional complicated structures can be welded to each other, that the reproducibility is high, that the high air-tightness can be maintained, that the welding strength is relatively high, that the borders of the welded portions are rarely recognizable with naked eye, and that fine dust is not generated.

As a laser welding method, there has been disclosed a method that involves placing a first resin member having low absorption for laser light and a second resin member having absorption for laser light on top of each other, and performing laser light irradiation through the first resin member so as to weld these members (for example, see PTL 1). Specifically, a resin composition that contains polyamide 6 and a modified ethylene-α-olefin copolymer (additive having low absorption for laser light) is used as the first resin member, and a resin composition that contains polyamide 6 and 0.3 wt % of carbon black (additive having absorption for laser light) is used as the second resin member.

Moreover, as a resin composition for laser welding, there has been disclosed a resin composition that contains a polyamide resin, a polycarbonate resin, and a filler such as glass fibers (for example, see PTL 2).

CITATION LIST

Patent Literature

PTL 1 Japanese Patent Application Laid-Open No. 2004-148800
PTL 2 Japanese Patent Application Laid-Open No. 2006-273992

SUMMARY OF INVENTION

Technical Problem

However, since the first resin member and the second resin member described in PTL 1 do not contain a filler or the like, the mechanical strength and stiffness have not been sufficient. Thus, the welded articles of these resin components have not been suitable for usages that require high mechanical strength and stiffness.

In addition, the resin composition described in PTL 2 also had an issue that the laser transmittance was not sufficient, and sufficient laser weldability was rarely obtained. In addition, the blend amount of the filler in the resin composition was small, and the mechanical strength and stiffness were not sufficient. In addition, when the blend amount of the filler was increased to increase mechanical strength and stiffness, an issue had arisen in that the laser transmittance and appearance of a molded body easily degraded.

The present invention has been made under the aforementioned circumstances, and an object thereof is to provide a polyamide resin composition that has high laser weldability that enables the composition to exhibit good welding strength during laser welding without degrading the laser light transmittance, as well as high mechanical strength and high heat resistance, and a method for manufacturing a laser-welded body by using the composition.

Solution to Problem

[1] A polyamide resin composition, comprising: 30 to 89.9 parts by mass of a polyamide resin (A) having a melting point of 300° C. or more as measured with a differential scanning calorimeter (DSC); 0 to 45 parts by mass of a polyamide resin (B) having substantially no melting point as measured with a differential scanning calorimeter (DSC); 0.1 to 5 parts by mass of a light-transmitting pigment (C); and 10 to 55 parts by mass of a fibrous filler (D), (a total of (A), (B), (C), and (D) is 100 parts by mass) wherein the polyamide resin (A) contains a dicarboxylic acid-derived component unit (a1) and a diamine-derived component unit (a2), the dicarboxylic acid-derived component unit (a1) contains 20 to 100 mol % of a component unit derived from terephthalic acid, and 0 to 80 mol % of at least one of a component unit derived from an aromatic dicarboxylic acid other than terephthalic acid and a component unit derived from an aliphatic dicarboxylic acid having 4 to 20 carbon atoms, relative to a total of 100 mol % of the dicarboxylic acid-derived component unit (a1), the diamine-derived component unit (a2) contains at least one of a component unit derived from an aliphatic diamine having 4 to 15 carbon atoms and a component unit derived from alicyclic diamine having 4 to 20 carbon atoms, a corrected heat of fusion ($\Delta H_R$) obtained by dividing a heat of fusion ($\Delta H$) of the polyamide resin composition as measured with a differential scanning calorimeter (DSC) by a ratio of a total mass of components other than the fibrous filler (D) to a total mass of the polyamide resin composition is 10 to 70 J/g, and a molded body of the polyamide resin composition has a laser light transmittance of 15% or more at a wavelength of 940 nm at a thickness of 1.6 mm.

[2] The polyamide resin composition according to [1], wherein the diamine-derived component unit (a2) contains 50 to 100 mol % of the component unit derived from an aliphatic diamine having 4 to 15 carbon atoms relative to a total of 100 mol % of the diamine-derived component unit (a2).

[3] The polyamide resin composition according to [2], wherein the component unit derived from an aliphatic diamine having 4 to 15 carbon atoms contains a component unit derived from a linear aliphatic diamine having 4 to 8 carbon atoms.

[4] The polyamide resin composition according to [3], wherein the component unit derived from a linear aliphatic diamine having 4 to 8 carbon atoms is a component unit derived from an alkylenediamine having 4 to 8 carbon atoms.

[5] The polyamide resin composition according to [4], wherein the component unit derived from an alkylenediamine having 4 to 8 carbon atoms is a component unit derived from 1,6-hexanediamine.

[6] The polyamide resin composition according to any one of [1] to [5], wherein the dicarboxylic acid-derived component unit (a1) further contains a component unit derived from isophthalic acid.

[7] The polyamide resin composition according to any one of [1] to [6], wherein the polyamide resin (B) contains a dicarboxylic acid-derived component unit (b1) and a diamine-derived component unit (b2), the dicarboxylic acid-derived component unit (b1) contains a component unit derived from isophthalic acid, and the diamine-derived component unit (b2) contains a component unit derived from an aliphatic diamine having 4 to 15 carbon atoms.

[8] The polyamide resin composition according to [7], wherein the dicarboxylic acid-derived component unit (b1) may further contain a component unit derived from terephthalic acid, and a molar ratio of the component unit derived from isophthalic acid to the component unit derived from terephthalic acid is the component unit derived from isophthalic acid/the component unit derived from terephthalic acid=55/45 to 100/0 (molar ratio).

[9] The polyamide resin composition according to any of [1] to [8], wherein a content of the fibrous filler (D) is 40 parts by mass or less relative to a total of 100 parts by mass of (A), (B), (C), and (D).

[10] A light-transmitting resin composition for laser welding, comprising the polyamide resin composition according to any of [1] to [9].

[11] A molded body obtained by molding the polyamide resin composition according to any of [1] to [9].

[12] A method for manufacturing a laser-welded body, comprising: molding the polyamide resin composition according to any of [1] to [9] to obtain a first molded body; molding a light-absorbing resin composition that contains a thermoplastic resin and a light-absorbing pigment to obtain a second molded body; and placing the first molded body and the second molded body on top of each other and welding the first molded body and the second molded body by laser light irradiation through the first molded body.

[13] The method for manufacturing a laser-welded body according to [12], wherein the thermoplastic resin is a polyamide resin.

[14] The method for manufacturing a laser-welded body according to [13], wherein the polyamide resin is the same as the polyamide resin (A) contained in the polyamide resin composition.

Advantageous Effects of Invention

According to the present invention, a polyamide resin composition that has high laser weldability that enables the composition to exhibit good welding strength during laser welding without degrading the laser light transmittance, as well as high mechanical strength and high heat resistance can be provided. According to a method for manufacturing a laser-welded body by using a molded body of such a polyamide resin composition, a laser-welded body having high welding strength can be provided.

BRIEF DESCRIPTION OF DRAWINGS

FIG. 1 is a schematic diagram illustrating a method for measuring welding strength.

DESCRIPTION OF EMBODIMENTS

The inventors of the present invention have found that a polyamide resin composition that contains a particular polyamide resin (A) and a light-transmitting pigment (C) and has an adjusted corrected heat of fusion ($\Delta H_R$) can exhibit good welding strength during laser welding without notably degrading the laser light transmittances even when a relatively large amount of a fibrous filler (D) is contained. It has been found that, due to this, the polyamide resin composition can exhibit good welding strength during laser welding while having good mechanical strength and heat resistance.

The reason for this is not clear but is presumably as follows. In order to laser-weld molded bodies to each other with high welding strength (joint strength), it is usually desirable to sufficiently fuse the resin in a welding site by the energy of laser light to form a large fusion zone.

In this respect, the particular polyamide resin (A) and the light-transmitting pigment (C) contained in the polyamide resin composition of the present invention transmit laser light relatively easily. Thus, the polyamide resin composition can maintain good laser light transmittance despite incorporation of the fibrous filler (D). Moreover, since the polyamide resin composition contains a polyamide resin (A) having an appropriately adjusted crystallinity and, if needed, a low-crystallinity polyamide resin (B), the corrected heat of fusion ($\Delta H_R$) of the polyamide resin composition is adjusted to an appropriately low level that does not impair mechanical strength and heat resistance. In other words, the energy needed to fuse the crystal portion is decreased. Presumably as a result, the resin can be sufficiently fused even when the irradiation energy of the laser light is low, a large fusion zone can be easily formed, and high welding strength (joint strength) can be easily obtained.

The corrected heat of fusion ($\Delta H_R$) of the polyamide resin composition can be adjusted by appropriately decreasing the crystallinity of the polyamide resin (A), combining a polyamide resin (A) having a relatively high crystallinity and a polyamide resin (B) having a relatively low crystallinity, or increasing the fibrous filler (D) content. The present invention has been made on the basis of such findings.

1. Polyamide Resin Composition

A polyamide resin composition of the present invention contains a polyamide resin (A), a polyamide resin (B), a light-transmitting pigment (C), and a fibrous filler (D).

1-1. Polyamide Resin (A)

The polyamide resin (A) is a polyamide resin having a melting point (Tm) as measured with a differential scanning calorimeter (DSC). The melting point (Tm) of the polyamide resin (A) as measured with a differential scanning calorimeter (DSC) is preferably 300 to 340° C. When the melting point (Tm) of the polyamide resin (A) is 300° C. or more, high heat resistance can be easily imparted to a molded body, and, when the melting point is 340° C. or less, there is no need to excessively increase the molding temperature, and thus pyrolysis of the resin and other components during melt polymerization and molding can be suppressed. The melting point of the polyamide resin (A) is more preferably 300 to 330° C.

The glass transition temperature (Tg) of the polyamide resin (A) as measured with a differential scanning calorimeter (DSC) is preferably 80 to 150° C. and more preferably 90 to 135° C.

The melting point (Tm) and the glass transition temperature (Tg) of the polyamide resin (A) can be measured with a differential scanning calorimeter (for example, model DSC220C produced by Seiko Instruments Inc.). The specific measurement conditions can be the same as those in the examples described below.

The melting point (Tm) and the glass transition temperature (Tg) of the polyamide resin (A) can be adjusted by, for example, the composition of the dicarboxylic acid-derived component unit (a1) described below. In order to increase the melting point of the polyamide resin (A), for example, the content ratio of a component unit derived from terephthalic acid may be increased.

The heat of fusion (ΔH) of the polyamide resin (A) measured with a differential scanning calorimeter (DSC) preferably exceeds 5 J/g. The heat of fusion is an indicator of the crystallinity of the resin, and a larger heat of fusion indicates higher crystallinity. When the heat of fusion (ΔH) of the polyamide resin (A) exceeds 5 J/g, the heat resistance and the mechanical strength of the obtained molded body can be increased due to the high crystallinity. The polyamide resin (A) is preferably crystalline.

The heat of fusion (ΔH) is a value determined in compliance with JIS K 7122. That is, the heat of fusion (ΔH) is determined from the area of an exothermic peak associated with crystallization in a differential scanning calorimetry chart obtained by performing a scan at a temperature elevation rate of 10° C./min by differential scanning calorimetry (DSC). The heat of fusion (ΔH) is a value observed during the first temperature elevation cycle in which the history is not erased.

The polyamide resin (A) contains a dicarboxylic acid-derived component unit (a1) and a diamine-derived component unit (a2).

[Dicarboxylic Acid-Derived Component Unit (a1)]

The dicarboxylic acid-derived component unit (a1) preferably contains at least a component unit derived from terephthalic acid. A polyamide resin (A) that contains a component unit derived from terephthalic acid has high crystallinity and can impart good heat resistance and mechanical strength (tensile strength and stiffness) to a molded body.

Specifically, the dicarboxylic acid-derived component unit (a1) more preferably contains 20 to 100 mol % of a component unit derived from terephthalic acid, and at least one of 0 to 80 mol % of a component unit derived from an aromatic dicarboxylic acid other than terephthalic acid and 0 to 40 mol % of a component unit derived from an aliphatic dicarboxylic acid having 4 to 20 carbon atoms, and yet more preferably contains 55 to 100 mol % of a component unit derived from terephthalic acid and 0 to 45 mol % of a component unit derived from an aromatic dicarboxylic acid other than terephthalic acid. Here, the total amount of the dicarboxylic acid-derived component unit (a1) is assumed to be 100 mol %.

Examples of terephthalic acid include terephthalic acid and terephthalic acid esters (C1-C4 alkyl esters of terephthalic acid).

Examples of the aromatic dicarboxylic acid other than terephthalic acid include isophthalic acid, 2-methylterephthalic acid, naphthalene dicarboxylic acid, and esters thereof, and isophthalic acid is preferable.

The aliphatic dicarboxylic acid having 4 to 20 carbon atoms is preferably an aliphatic dicarboxylic acid having 6 to 12 carbon atoms, examples thereof include malonic acid, dimethylmalonic acid, succinic acid, glutaric acid, adipic acid, 2-methyladipic acid, trimethyladipic acid, pimelic acid, 2,2-dimethylglutaric acid, 3,3-diethyl succinic acid, azelaic acid, sebacic acid, and suberic acid, and adipic acid is preferable.

In the dicarboxylic acid-derived component unit (a1), the molar ratio of the component unit derived from terephthalic acid to the component unit derived from an aromatic dicarboxylic acid (preferably isophthalic acid) other than terephthalic acid is preferably component unit derived from terephthalic acid/component content derived from aromatic dicarboxylic acid (preferably isophthalic acid) other than terephthalic acid=55/45 to 80/20 and more preferably 60/40 to 85/15. When the amount of the component unit derived from terephthalic acid is a particular level or more, the heat resistance and mechanical strength of the obtained molded body can be easily increased. When the amount of the component unit derived from terephthalic acid is a particular level or less, irradiation energy of laser light required to laser-weld the obtained molded body can be easily decreased.

As long as the effects of the present invention are not impaired, the dicarboxylic acid-derived component unit (a1) may further contain a component unit derived from an alicyclic dicarboxylic acid. Examples of the alicyclic dicarboxylic acid include 1,4-cyclohexanedicarboxylic acid and 1,3-cyclohexanedicarboxylic acid.

[Diamine-Derived Component Unit (a2)]

The diamine-derived component unit (a2) contains at least one of a component unit derived from an aliphatic diamine having 4 to 15 carbon atoms and a component unit derived from an alicyclic diamine having 4 to 20 carbon atoms.

The component unit derived from an aliphatic diamine having 4 to 15 carbon atoms preferably contains a component unit derived from a linear aliphatic diamine having 4 to 8 carbon atoms.

A linear aliphatic diamine having 4 to 8 carbon atoms is more preferably a linear aliphatic diamine having 6 to 8 carbon atoms. Examples of the linear aliphatic diamine having 4 to 8 carbon atoms include linear alkylene diamines having 4 to 8 carbon atoms, such as 1,4-diaminobutane, 1,6-hexanediamine, 1,7-diaminoheptane, and 1,8-octanediamine. Among these, 1,6-hexanediamine is preferable. Only one component unit or two or more component units derived from a linear aliphatic diamine having 4 to 8 carbon atoms may be contained.

The component unit derived from an aliphatic diamine having 4 to 15 carbon atoms may further contain a component unit derived from a branched aliphatic diamine having 4 to 15 carbon atoms. Examples of the branched aliphatic diamine having 4 to 15 carbon atoms include 2-methyl-1,8-octanediamine and 2-methyl-1,5-pentanediamine. Such a branched aliphatic diamine can appropriately decrease the crystallinity of the polyamide resin (A). Thus, from the viewpoints of appropriately decreasing the corrected heat of fusion ($\Delta H_R$) of the polyamide resin composition and easily increasing the welding strength, the component unit derived from an aliphatic diamine having 4 to 15 carbon atoms preferably contains a component unit derived from a branched aliphatic diamine.

Examples of the alicyclic diamine having 4 to 20 carbon atoms include 1,3-diaminocyclohexane, 1,4-diaminocyclohexane, 1,3-bis(aminomethyl)cyclohexane, 1,4-bis(aminomethyl)cyclohexane, isophoronediamine, piperazine, 2,5-dimethylpiperazine, bis(4-aminocyclohexyl)methane, bis(4-aminocyclohexyl)propane, 4,4'-diamino-3,3'-dimethyldicyclohexylpropane, 4,4'-diamino-3,3'-dimethyldicyclohexylmethane, 4,4'-diamino-3,3'-dimethyl-5,5'-dimethyldicyclohexylmethane, 4,4'-diamino-3,3'-dimethyl-5,5'-dimethyldicyclohexylpropane, α,α'-bis(4-aminocyclohexyl)-p-diisopropylbenzene, α,α'-bis(4-aminocyclohexyl)-m-diisopropylbenzene, α,α'-bis(4-aminocyclohexyl)-1,4-cyclohexane, and α,α'-bis(4-aminocyclohexyl)-1,3-cyclohexane. Among these, 1,3-diaminocyclohexane, 1,4-diaminocyclohexane, bis(aminomethyl)cyclohexane, bis(4-aminocyclohexyl)methane, and 4,4'-diamino-3,3'- dimethyldicyclohexylmethane are preferable, and 1,3-diaminocyclohexane, 1,4-diaminocyclohexane, bis(4-aminocyclohexyl)methane, 1,3-bis(aminocyclohexyl)methane, and 1,3-bis(aminomethyl)cyclohexane are more preferable.

The total content (preferably, the content of the component unit derived from an aliphatic diamine having 4 to 15 carbon atoms) of the component unit derived from an aliphatic diamine having 4 to 15 carbon atoms and a component unit derived from alicyclic diamine having 4 to 20 carbon atoms is preferably 50 mol % or more relative to the total amount of the diamine-derived component unit (a2). When the aforementioned total content is 50 mol % or more, the water resistance of the obtained molded body is easily increased. The total content (preferably, the content of a component unit derived from the C4-C8 linear aliphatic diamine) of the component unit derived from an aliphatic diamine having 4 to 15 carbon atoms and a component unit derived from an alicyclic diamine having 4 to 20 carbon atoms is more preferably 70 mol % or more, is yet more preferably 90 mol % or more, and may be 100 mol %. Here, the total amount of the diamine-derived component unit (a2) is assumed to be 100 mol %.

As long as the effects of the present invention are not impaired, the diamine-derived component unit (a2) may further contain a component unit derived from other diamines. Examples of other diamines include aromatic diamines. Examples of the aromatic diamines include metaxylylenediamine. The content of the component unit derived from other diamines can be 50 mol % or less and is preferably 40 mol % or less relative to the total amount of the diamine-derived component unit (a2).

Specific examples of the polyamide resin (A) include a resin in which the dicarboxylic acid-derived component unit (a1) is a component unit derived from terephthalic acid and a component unit derived from isophthalic acid, and the component unit derived from a linear aliphatic diamine is a component unit derived from 1,6-diaminohexane; and a resin in which the dicarboxylic acid-derived component unit (a1) is a component unit derived from terephthalic acid and a component unit derived from adipic acid, and the component unit derived from a linear aliphatic diamine is a component unit derived from 1,6-diaminohexane. Only one polyamide resin (A) or two or more polyamide resins (A) may be contained.

The intrinsic viscosity [η] of the polyamide resin (A) as measured in 96.5% sulfuric acid at a temperature of 25° C. is preferably 0.7 to 1.6 dl/g and more preferably 0.8 to 1.2 dl/g. When the intrinsic viscosity [η] of the polyamide resin (A) is a particular value or more, the strength of the molded body is easily increased. When the intrinsic viscosity [η] is a particular value or less, the flowability of the resin composition during molding is rarely impaired. The intrinsic viscosity [η] is adjusted by the molecular weight of the polyamide resin (A).

Regarding the intrinsic viscosity of the polyamide resin (A), 0.5 g of the polyamide resin (A) is dissolved in 50 ml of a 96.5% sulfuric acid solution to prepare a sample solution. The sample solution outflow time in seconds is measured with a Ubbelohde viscometer under the condition of 25±0.05° C., and the obtained value is substituted into the following equation to calculate the intrinsic viscosity.

$$[\eta]=\eta SP/[C(1+0.205\eta SP)]$$

In the equation above, the respective algebra and variables represent the following.

[η]: Intrinsic viscosity (dl/g)
ηSP: Specific viscosity
C: Sample concentration (g/dl)

ηSP is determined from by the following equation:

$$\eta SP=(t-t0)/t0$$

t: The sample solution outflow time in seconds (sec)
t0: The blank sulfuric acid outflow time in seconds (sec)

From the viewpoint of the thermal stability during compounding and molding, the terminal groups of at least some of the molecules in the polyamide resin (A) may be capped with a terminal-capping agent. The amount of terminal amino groups of the polyamide resin (A) is preferably 0.1 to 300 mmol/kg, more preferably 20 to 300 mmol/kg, and yet more preferably 35 to 200 mmol/kg.

The amount of terminal amino groups can be measured by the following method. In 35 mL of phenol, 1 g of the polyamide resin is dissolved, and 2 mL of methanol is mixed thereto to obtain a sample solution. Next, the sample solution is titrated with a 0.01N HCl aqueous solution using thymol blue as the indicator from blue to yellow so as to measure the amount of terminal amino groups ([NH$_2$], unit: mmol/kg).

The polyamide resin (A) can be manufactured by the same method as known polyamide resins, and, for example, can be manufactured by causing a dicarboxylic acid and a diamine to undergo polycondensation in a homogeneous solution. Specifically, as described in international publication No. 03/085029, the polyamide resin (A) can be manufactured by heating a dicarboxylic acid and a diamine in the presence of a catalyst to obtain a low-order condensation product, and then applying shear stress to a melt of the low-order condensation product to perform polycondensation.

When the intrinsic viscosity of the polyamide resin (A) is to be adjusted, a terminal-capping agent (molecular weight adjustor) is preferably added to the reaction system. The terminal-capping agent can be, for example, a monocarboxylic acid or a monoamine. Examples of the monocarboxylic acid include aliphatic monocarboxylic acids, aromatic monocarboxylic acids, and alicyclic monocarboxylic acids having 2 to 30 carbon atoms. These terminal-capping agents can adjust the molecular weight of the polyamide resin (A) and the amount of the terminal amino groups in the polyamide resin (A). The aromatic monocarboxylic acids and the alicyclic monocarboxylic acids may have substituents in the cyclic structure moieties.

Examples of the aliphatic monocarboxylic acids include acetic acid, propionic acid, butyric acid, valeric acid, caproic acid, caprylic acid, lauric acid, tridecyl acid, myristic acid, palmitic acid, stearic acid, oleic acid, and linoleic acid. Examples of the aromatic monocarboxylic acids include benzoic acid, toluic acid, naphthalenecarboxylic acid, methylnaphthalenecarboxylic acid, and phenylacetic acid. Examples of the alicyclic monocarboxylic acids include cyclohexanecarboxylic acid.

The terminal-capping agent is added to the reaction system of the dicarboxylic acid and the diamine. The added amount is preferably 0.07 mol or less and more preferably 0.05 mol or less relative to 1 mol of the total amount of the dicarboxylic acid. When the molecular-weight adjustor is used in such an amount, at least part thereof is incorporated into the polyamide, and thus the intrinsic viscosity [η] of the polyamide resin (A) is easily adjusted to be within the desirable range.

The polyamide resin (A) content is preferably 30 to 89.9 parts by mass when the total of the polyamide resin (A), the polyamide resin (B), the light-transmitting pigment (C), and the fibrous filler (D) is assumed to be 100 parts by mass. When the polyamide resin (A) content is 30 parts by mass or more, the mechanical strength and heat resistance of the molded body can be easily increased, and when the content is 89.9 parts by mass or less, the irradiation energy of laser light required to weld the molded body can be easily decreased. The polyamide resin (A) content is more preferably 40 to 85 parts by mass and yet more preferably 60 to 85 parts by mass when the total of the polyamide resin (A), the polyamide resin (B), the light-transmitting pigment (C), and the fibrous filler (D) is assumed to be 100 parts by mass.

The polyamide resin (A) content is preferably 85.7 to 99.9 parts by mass when the total of the polyamide resin (A) and the polyamide resin (B) is assumed to be 100 parts by mass. When the polyamide resin (A) content is within the aforementioned range, the laser light transmittance can be further increased, and a molded body that has excellent laser weldability can be easily obtained. A molded body that has a high laser light transmittance and excellent laser weldability as such is preferable for use as a light-transmitting resin member used in laser welding. From the aforementioned viewpoints, the polyamide resin (A) content is more preferably 90 to 99.9 parts by mass when the total of the polyamide resin (A) and the polyamide resin (B) is assumed to be 100 parts by mass.

1-2. Polyamide Resin (B)

The polyamide resin (B) is a polyamide resin from which the melting point (Tm) is not substantially measured with a differential scanning calorimeter (DSC). Since such a polyamide resin (B) has appropriately low crystallinity, the corrected heat of fusion ($\Delta H_R$) of the polyamide resin composition can be easily decreased, and the irradiation energy of laser light required to laser-weld the obtained molded body can be decreased. Moreover, the impact resistance of the obtained molded body can be increased.

That "the melting point (Tm) is not substantially measured" means that, in the aforementioned melting point measurement using a differential scanning calorimeter (DSC), an endothermic peak attributable to crystal fusion is not substantially observed during the second cycle of heating (from room temperature to 330° C.). That the endothermic peak is not substantially observed means that the heat of fusion ($\Delta H$) of the polyamide resin (B) measured by differential scanning calorimetry (DSC) is 5 J/g or less.

In other words, the heat of fusion ($\Delta H$) of the polyamide resin (B) measured by differential scanning calorimetry (DSC) is preferably 5 J/g or less and more preferably 0 J/g. The heat of fusion ($\Delta H$) of the polyamide resin (B) is preferably 5 J/g or less since the crystallinity is appropriately low, and thus the compatibility with the polyamide resin (A) is excellent, and the appearance of the molded body of the polyamide resin composition is excellent. The polyamide resin (B) is preferably amorphous. The heat of fusion ($\Delta H$) can be measured by the same method as the one described above.

The polyamide resin (B) contains a dicarboxylic acid-derived component unit (b1) and a diamine-derived component unit (b2).

[Dicarboxylic Acid-Derived Component Unit (b1)]

The dicarboxylic acid-derived component unit (b1) preferably contains at least a component unit derived from isophthalic acid. The component unit derived from isophthalic acid can decrease the crystallinity of the polyamide resin (B).

The content of the component unit derived from isophthalic acid is preferably 40 mol % or more and more preferably 50 mol % or more relative to the total amount of the dicarboxylic acid-derived component unit (b1). When the amount of the component unit derived from isophthalic acid is 40 mol % or more, irradiation energy of laser light required to laser-weld the obtained molded body can be easily decreased.

As long as the effects of the present invention are not impaired, the dicarboxylic acid-derived component unit (b1) may further contain a component unit derived from other dicarboxylic acids other than the component unit derived from isophthalic acid. Examples of the other dicarboxylic acids include aromatic dicarboxylic acids, such as terephthalic acid, 2-methylterephthalic acid, and naphthalenedicarboxylic acid, other than isophthalic acid; aliphatic dicarboxylic acids; and alicyclic dicarboxylic acids. The aliphatic dicarboxylic acids and the alicyclic dicarboxylic acids can be the same as the aforementioned aliphatic dicarboxylic acids and alicyclic dicarboxylic acids. Among these, aromatic dicarboxylic acids other than isophthalic acid are preferable, and terephthalic acid is more preferable.

In the dicarboxylic acid-derived component unit (b1), the molar ratio of the component unit derived from isophthalic acid to the component unit derived from an aromatic dicarboxylic acid (preferably terephthalic acid) other than isophthalic acid is preferably component unit derived from isophthalic acid/component unit derived from aromatic dicarboxylic acid (preferably terephthalic acid) other than isophthalic acid=55/45 to 100/0 (molar ratio) and more preferably 60/40 to 90/10 (molar ratio). When the amount of the component unit derived from isophthalic acid is a particular level or more, the polyamide resin (B) is likely to be amorphous, and irradiation energy of laser light required to laser-weld the obtained molded body can be easily decreased. When the amount of the component unit derived from isophthalic acid is a particular level or less, the heat resistance and mechanical strength of the obtained molded body are not easily impaired.

[Diamine-Derived Component Unit (b2)]

The diamine-derived component unit (b2) preferably contains a component unit derived from an aliphatic diamine having 4 to 15 carbon atoms.

The aliphatic diamine having 4 to 15 carbon atoms is the same as the aliphatic diamine having 4 to 15 carbon atoms described above, and is preferably 1,6-hexanediamine.

The content of the component unit derived from an aliphatic diamine having 4 to 15 carbon atoms is preferably 50 mol % or more and more preferably 60 mol % or more relative to the total amount of the diamine-derived component unit (b2).

As long as the effects of the present invention are not impaired, the diamine-derived component unit (b2) may further contain a component unit derived from diamines other than the component unit derived from the aliphatic diamine having 4 to 15 carbon atoms. Examples of other diamines include alicyclic diamines and aromatic diamines. The alicyclic diamines and the aromatic diamines can respectively be the same as the alicyclic diamines and aromatic diamines described above. The content of other diamine component unit is 50 mol % or less and preferably 40 mol % or less.

Specific examples of the polyamide resin (B) include a polycondensation product of isophthalic acid/terephthalic acid/1,6-hexanediamine/bis(3-methyl-4-aminocyclohexyl) methane, a polycondensation product of isophthalic acid/bis(3-methyl-4-aminocyclohexyl)methane/ω-laurolactam, a polycondensation product of isophthalic acid/terephthalic acid/1,6-hexanediamine, a polycondensation product of isophthalic acid/2,2,4-trimethyl-1,6-hexanediamine/2,4,4-trimethyl-1,6-hexanediamine, a polycondensation product of isophthalic acid/terephthalic acid/2,2,4-trimethyl-1,6- hexanediamine/2,4,4-trimethyl-1,6-hexanediamine, a polycondensation product of isophthalic acid/bis(3-methyl-4-aminocyclohexyl)methane/ω-laurolactam, and a polycondensation product of isophthalic acid/terephthalic acid/other diamine components. Among these, a polycondensation product of isophthalic acid/terephthalic acid/1,6-hexanediamine is preferable. Only one polyamide resin (B) or two or more polyamide resins (B) may be contained.

The intrinsic viscosity [η] of the polyamide resin (B) as measured in 96.5% sulfuric acid at a temperature of 25° C. is preferably 0.6 to 1.6 dl/g and more preferably 0.65 to 1.2 dl/g. The intrinsic viscosity [η] of the polyamide resin (B) can be measured by the same method as that for measuring the intrinsic viscosity [η] of the polyamide resin (A) described above.

The polyamide resin (B) can be manufactured by the same method as that for the polyamide resin (A) described above.

The polyamide resin (B) content is preferably 0 to 45 parts by mass, may be 0.1 to 45 parts by mass, or may be 5 to 35 parts by mass when the total of the polyamide resin (A), the polyamide resin (B), the light-transmitting pigment (C), and the fibrous filler (D) is assumed to be 100 parts by mass. When the polyamide resin (B) content is 0.1 parts by mass or more, the obtained molded body can be easily laser-welded with less irradiation energy, and when the content is 45 parts by mass or less, the mechanical strength and the heat resistance (deflection under load) of the molded body are rarely notably impaired.

The polyamide resin (B) content is preferably 0 to 60 parts by mass, more preferably 5 to 50 parts by mass, and yet more preferably 10 to 40 parts by mass relative to a total 100 parts by mass of the polyamide resin (A) and the polyamide resin (B). When the content of the polyamide resin (B) relative to a total of 100 parts by mass of the polyamide resin (A) and the polyamide resin (B) is 5 parts by mass or more, the irradiation energy of laser light required to weld the obtained molded body can be easily decreased, and when the content is 50 parts by mass or less, sufficient heat resistance and stiffness (deflection under load) can be easily imparted to the molded body.

1-3. Light-Transmitting Pigment (C)

The light-transmitting pigment (C) is a component for coloring the polyamide resin composition without degrading the laser light transmittance. That is, the light-transmitting pigment (C) is a pigment that has a laser light-transmitting property, and is, specifically, a pigment that does not have a local maximum value of an absorption wavelength within the wavelength range of 800 to 1064 nm.

The light-transmitting pigment (C) is preferably a black pigment that satisfies the properties described below. Examples of such a black pigment include naphthalocyanine, aniline black, phthalocyanine, porphyrin, perylene, quaterrylene, azo dyes, anthraquinone, squaric acid derivatives, and immonium dyes.

Examples of the commercially available products of the light-transmitting pigment (C) are eBind ACW-9871, e-BIND LTW-8731H, and e-BIND LTW-8701H which are coloring agents produced by Orient Chemical Industries Co., Ltd. Moreover, a black pigment obtained by mixing two or more chromatic color pigments may be used.

The light-transmitting pigment (C) content may be set so that the transmittance of the polyamide resin composition for the light having a wavelength of 940 nm is within the range described below. Specifically, the light-transmitting pigment (C) content is preferably 0.1 to 5 parts by mass when the total of the polyamide resin (A), the polyamide resin (B), the light-transmitting pigment (C), and the fibrous filler (D) is assumed to be 100 parts by mass. When the light-transmitting pigment (C) content is 0.1 parts by mass or more, coloring can be easily and sufficiently conducted, and thus the design property can be improved, and when the content is 5 parts by mass or less, notable degradation of the laser light transmittance and notable degradation of the welding strength resulting therefrom, and degradation of continuous productivity during kneading or molding caused by decomposition of the pigment component can be more reliably suppressed. From the aforementioned viewpoint, the light-transmitting pigment (C) content is preferably 0.1 to 4 parts by mass, more preferably 0.1 to 3 parts by mass, and yet more preferably 0.25 to 2.5 parts by mass when the total of the polyamide resin (A), the polyamide resin (B), the light-transmitting pigment (C), and the fibrous filler (D) is assumed to be 100 parts by mass.

Only one light-transmitting pigment (C) or two or more light-transmitting pigments (C) may be contained. When two or more light-transmitting pigments are contained, the total amount is preferably within the aforementioned range.

1-4. Fibrous Filler (D)

Examples of the fibrous filler (D) include glass fibers, wollastonite, potassium titanate whiskers, calcium carbonate whiskers, aluminum borate whiskers, magnesium sulfate whiskers, zinc oxide whiskers, milled fibers, and cut fibers. Among these, one may be used alone or two or more may be used in combination. In particular, wollastonite, glass fibers, and potassium titanate whiskers are preferable and wollastonite and glass fibers are more preferable since the mechanical strength of the molded body can be easily increased.

The average fiber length of the fibrous filler (D) is preferably 1 μm to 20 mm, more preferably 5 μm to 10 mm, and yet more preferably 10 μm to 5 mm from the viewpoints of the moldability of the polyamide resin composition and the mechanical strength and heat resistance of the obtained molded body. The aspect ratio of the fibrous filler (D) is preferably 5 to 2000 and more preferably 30 to 600.

The average fiber length and average fiber diameter of the fibrous filler (D) can be measured by the following method.

1) After the polyamide resin composition is dissolved in a hexafluoroisopropanol/chloroform solution (0.1/0.9 vol %), the solution is filtered and the residue is sampled.

2) The residue obtained in the aforementioned 1) is dispersed in water, and the fiber length (Li) and the fiber diameter (di) of each of arbitrarily selected 300 fibers are measured with an optical microscope (magnification: 50×). Assuming that the number of fibers having a fiber length of Li is qi, the weight-average length (Lw) is calculated on the basis of the following equation, and the result is assumed to be the average fiber length of the fibrous filler (D).

$$\text{Weight-average length } (Lw)=(\Sigma qi \times Li^2)/(\Sigma qi \times Li)$$

Likewise, assuming that the number of fibers having a fiber diameter of Di is ri, the weight-average diameter (Dw) is calculated on the basis of the following equation, and the result is assumed to be the average fiber diameter of the fibrous filler (D).

$$\text{Weight-average diameter } (Dw)=(\Sigma ri \times Di^2)/(\Sigma ri \times Di)$$

The fibrous filler (D) may be surface-treated. The surface treatment easily increases the adhesion to the polyamide resin (A) that serves as a matrix resin. Examples of the surface treatment agent include coupling agents such as a silane coupling agent, a titanium coupling agent, and an aluminate coupling agent; and a sizing agent. Examples of the coupling agent that is preferably used include aminosilane, epoxysilane, methyltrimethoxysilane, methyltriethoxysilane, γ-glycidoxypropyltrimethoxysilane, vinyltriacetoxysilane, and vinyltrimethoxysilane. In addition, examples of the sizing agent that is preferably used include epoxy compounds, urethane compounds, carboxylic acid compounds, urethane/maleic acid-modified compounds, and urethane/amine-modified compounds. The fibrous filler (D) may be treated with one surface treatment agent or two or more surface treatment agents. In particular, when treated with a coupling agent and a sizing agent, the fibrous filler (D) easily exhibits increased adhesion to the polyamide resin (A), and the mechanical properties of the obtained molded body are easily increased.

The fibrous filler (D) content is preferably 10 to 55 parts by mass when the total of the polyamide resin (A), the polyamide resin (B), the light-transmitting pigment (C), and the fibrous filler (D) is assumed to be 100 parts by mass. When the fibrous filler (D) content is 10 parts by mass or more, high mechanical strength and heat resistance can be easily imparted to the molded body. When the fibrous filler (D) content is 55 parts by mass or less, the laser light-transmitting properties of the molded body are rarely impaired, and thus degradation of the welding strength and the excessive increase in viscosity during molding resulting therefrom rarely occur. The fibrous filler (D) content is preferably 10 to 50 parts by mass, more preferably 25 to 45 parts by mass, and yet more preferably 30 to 40 parts by mass when the total of the polyamide resin (A), the polyamide resin (B), the light-transmitting pigment (C), and the fibrous filler (D) is assumed to be 100 parts by mass.

1-5. Other Component (E)

The polyamide resin composition of the present invention may further contain a component (E) other than the polyamide resin (A), the polyamide resin (B), the light-transmitting pigment (C), and the fibrous filler (D), if needed. Examples of the other component include nucleating agents, elastomers (rubbers), flame retardants (bromine, chlorine, phosphorus, antimony, and inorganic flame retardants), flowability improvers, antistatic agents, release agents, antioxidants (phenols, amines, sulfur antioxidants, and phosphorus antioxidants), heat resistance stabilizers (lactone compounds, vitamin Es, hydroquinones, copper halides and iodine compounds), and light stabilizers (benzotriazoles, triazines, benzophenones, benzoates, hindered amines, and oxanilides), other polymers (polyolefins and olefin copolymers such as ethylene-propylene copolymers and ethylene-1-butene copolymers, olefin copolymers such as propylene-1-butene copolymers, polystyrene, polyamide, polycarbonate, polyacetal, polysulfone, polyphenylene oxide, fluororesins, silicone resins, and LCP). The total content of the other component is not particularly limited but is preferably 30 mass % or less and more preferably 10 mass % or less relative to the total mass of the polyamide resin composition.

1-5-1. Nucleating Agent

A nucleating agent may be any agent that promotes crystallization of the polyamide resin (A) and the polyamide resin (B), and can be a plate-like, powder-like, or particle-like filler.

Examples of the nucleating agent include silicates such as talc, zeolite, sericite, mica, kaolin, clay, pyrophyllite, and bentonite, metal compounds such as magnesium oxide, alumina, zirconium oxide, and iron oxide, carbonates such as calcium carbonate, magnesium carbonate, and dolomite, sulfates such as calcium sulfate and barium sulfate, glass beads, ceramic beads, boron nitride, calcium phosphate, hydroxides such as calcium hydroxide, magnesium hydroxide, and aluminum hydroxide, non-fibrous fillers such as glass flakes, glass powders, glass balloons, carbon black, silica, and graphite, smectite clay minerals such as montmorillonite, beidellite, nontronite, saponite, hectorite, and sauconite, various clay minerals such as vermiculite, halloysite, kanemite, kenyaite, zirconium phosphate, and titanium phosphate, and layered silicates represented by swelling mica such as Li-fluorotaeniolite, Na-fluorotaeniolite, Na-tetrasilicic fluoro mica, and Li-tetrasilicic fluoro mica. The layered silicate may be a layered silicate having interlayer exchangeable cations exchanged by organic onium ions, and the organic onium ions include ammonium ions, phosphonium ions, and sulfonium ions. One of these nucleating agents may be used alone or two or more of these nucleating agents may be used in combination. Among these, plate-like fillers such as talc, mica, kaolin, clay, glass flakes, carbon black, graphite, and montmorillonite are preferable, and talc, mica, and glass flakes are more preferable.

The nucleating agent may be further treated with a coupling agent such as those based on silane and titanate, and with other surface treatment agents. In particular, a nucleating agent treated with a coupling agent based on epoxysilane or aminosilane can be easily satisfactorily dispersed in the resin component, and can promote crystallization of the polyamide resin (A) and the polyamide resin (B); thus, good mechanical strength can be imparted to the obtained molded body.

The average particle diameter of the nucleating agent is preferably 0.1 to 30 μm. When the average particle diameter of the nucleating agent is 0.1 μm or more, the spherocrystals of the obtained molded body can be easily made finer, and when the average particle diameter is 30 μm or less, the appearance of the surface of the molded body is rarely degraded. The average particle diameter of the nucleating agent is more preferably 0.5 to 25 μm, and more preferably 1.0 to 23 μm. The average particle diameter of the nucleating agent is an arithmetic mean diameter obtained by laser diffraction/scattering measurement, and is a volume-average particle diameter (MV).

The nucleating agent content is preferably 0.01 to 10 mass % relative to the total mass of the polyamide resin composition. When the nucleating agent content is 0.01 mass % or more, crystallization of the polyamide resin is sufficiently promoted, and thus, the spherocrystals of the obtained molded body can be easily made finer; and when the content is 10 mass % or less, moldability and surface appearance are rarely degraded. The nucleating agent content is preferably 0.01 to 5 mass % and more preferably 0.1 to 2 mass % relative to the total mass of the polyamide resin composition.

Note that the polyamide resin composition of the present invention is substantially free of a light-absorbing pigment. The phrase substantially free means, for example, that the amount is 0.0001 mass % or less of the polyamide resin composition.

1-6. Physical Properties (Corrected Heat of Fusion ($\Delta H_R$))

The corrected heat of fusion ($\Delta H_R$) of the polyamide resin composition of the present invention as measured with a differential scanning calorimeter (DSC) is preferably 10 to 70 J/g. When the corrected heat of fusion ($\Delta H_R$) of the polyamide resin composition is 10 J/g or more, the heat resistance of the molded body can be easily sufficiently increased, and when it is 70 J/g or less, most of the energy of the laser light is not consumed to fuse the crystal portion, and thus a large fusion zone can be easily formed and the welding strength can be easily increased. From the viewpoint of further easily increasing the welding strength, the corrected heat of fusion ($\Delta H_R$) of the polyamide resin composition is more preferably 10 to 53 J/g.

The corrected heat of fusion ($\Delta H_R$) is a value obtained by dividing the heat of fusion ($\Delta H$) of the polyamide resin composition by the ratio of the total mass of the components other than the fibrous filler (D) to the total mass of the polyamide resin composition. The heat of fusion ($\Delta H$) of the polyamide resin composition can be measured by the same method as that for measuring the heat of fusion ($\Delta H$) of the polyamide resins (A) and (B).

The corrected heat of fusion ($\Delta H_R$) of the polyamide resin composition can be adjusted by the composition of the polyamide resin (A), the content ratios of the polyamide resin (A) and the polyamide resin (B), etc. In order to decrease the corrected heat of fusion ($\Delta H_R$), for example, a component that can decrease crystallinity, for example, isophthalic acid, or a branched aliphatic diamine may be added to the polyamide resin (A), the content ratio of the polyamide resin (B) that can decrease crystallinity may be increased, or (B/(A+B)) may be increased.

(Laser Light Transmittance)

The laser light transmittance of the polyamide resin composition of the present invention at a wavelength of 940 nm is preferably 15% or more, more preferably 36% or more, and yet more preferably 45% or more when the thickness of the molded body is 1.6 mm. The laser light transmittance of the molded body of the polyamide resin composition of the present invention at a wavelength of 940 nm is preferably 7.2% or more, more preferably 10% or more, and yet more preferably 12% or more when the thickness of the molded body is 3.2 mm. The upper limit of the laser light transmittance at a wavelength of 940 nm is not particularly limited, and, for example, may be 70% or 60%. The laser light transmittance of the polyamide resin composition can be measured by comparing intensities of the laser light that has passed through the sample and that has not passed through the sample by using a power meter F300-SH produced by Ophir Optronics Solutions Ltd.

The laser light transmittance at a wavelength of 940 nm can be adjusted by the composition of the polyamide resin (A), and the type and content of the light-transmitting pigment (C). In order to increase the laser light transmittance at a wavelength of 940 nm, a component that does not have excessively high crystallinity is preferably contained as the component that constitutes the polyamide resin (A), and the light-transmitting pigment (C) content is preferably decreased.

Thus, the polyamide resin composition of the present invention has a high laser light transmittance despite incorporation of the fibrous filler (D). Thus, the polyamide resin composition of the present invention can be preferably used as a light-transmitting resin composition for laser welding.

2. Method for Manufacturing Polyamide Resin Composition

The method for manufacturing the polyamide resin composition of the present invention is not particularly limited, and the polyamide resin composition can be manufactured through a step of melt-kneading at least the polyamide resin (A), the polyamide resin (B), the light-transmitting pigment (C), and the fibrous filler (D) in the aforementioned ratios in a single-screw extruder, a multi-screw extruder, a kneader, a Banbury mixer, or the like, and granulating or crushing the resulting melt kneaded product. Note that, if needed, a step of performing mixing by a known method, for example, a Henschel mixer, a V-blender, a ribbon blender, a tumbler blender, or the like may be performed before the melt-kneading step.

In particular, a melt-kneading method that uses a single- or twin-screw extruder equipped with a facility capable of devolatilization from a vent port is preferable. The polyamide resin (A), the polyamide resin (B), the light-transmitting pigment (C), the fibrous filler (D), and other component (E) blended if needed may be fed to the extruder in a single batch, or blend components may be sequentially fed to the polyamide resin (A). The fibrous filler (D) such as glass fibers is preferably fed to the extruder in the intermediate stage in order to suppress crushing during kneading. Moreover, of the components (A) to (D) described above, two or more components may be preliminarily mixed and kneaded. For example, nigrosine used as the light-transmitting pigment (C) may be prepared into a master batch using a thermoplastic resin in advance, and this master batch may be melt-kneaded with the rest of the blend components at a particular blend ratio.

The thermoplastic resin used in the master batch is preferably a polyamide resin. The polyamide resin used in the master batch may be the polyamide resin (A) or a polyamide resin other than the polyamide resin (A), for example, polyamide 6 or polyamide 66. For example, the light-transmitting pigment (C) prepared into a master batch by using polyamide 66 can be used.

3. Molded Body

A molded body of the present invention can be obtained by molding the polyamide resin composition of the present invention.

The molding method is not particularly limited, and any known molding method, that is, injection molding, hollow molding, extrusion molding, press molding, or the like, can be applied. In particular, injection molding is preferable from the viewpoint of good flowability. In injection molding, the resin temperature is preferably adjusted to 250 to 300° C.

The molded body of the polyamide resin composition of the present invention has a high laser light transmittance despite incorporation of the fibrous filler (D). Thus, the molded body of the polyamide resin composition of the present invention can be preferably used as a light-transmitting resin member that transmits laser light in the laser welding method.

4. Method for Manufacturing Laser-Welded Body

In the present invention, a laser-welded body can be manufactured by welding a molded body (first molded body or light-transmitting resin member) of the polyamide resin composition of the present invention and a molded body of a light-absorbing resin composition (second molded body or light-absorbing resin member) by performing laser light irradiation through the first molded body (light-transmitting resin member). In this manner, the first molded body (light-transmitting resin member) and the second molded body (light-absorbing resin member) can be firmly welded without using an adhesive.

First, the light-absorbing resin composition that constitutes the second molded body serving as a light-absorbing resin member is described.

4-1. Light-Absorbing Resin Composition

The light-absorbing resin composition contains a thermoplastic resin and a light-absorbing pigment.

4-1-1. Thermoplastic Resin

The thermoplastic resin is not particularly limited and is preferably a polyamide resin from the viewpoint of easily obtaining good welding strength with the molded body of the polyamide resin composition of the present invention.

The melting point (Tm) of the polyamide resin as measured with a differential scanning calorimeter (DSC) is preferably 290 to 340° C. The glass transition temperature (Tg) of the polyamide resin as measured with a differential scanning calorimeter (DSC) is preferably 75 to 150° C. The melting point (Tm) and the glass transition temperature (Tg) of the polyamide resin can be measured by the same method as the one described above. A light-absorbing resin composition that contains a polyamide resin having such a melting point (Tm) and such a glass transition temperature (Tg) not only has high mechanical strength and heat resistance but also exhibits good compatibility with the polyamide resin (A) contained in the polyamide resin composition described above; thus, the welding strength with the molded body (first molded body) of the aforementioned polyamide resin composition can be easily increased.

The polyamide resin is not particularly limited as long as the melting point (Tm) and the glass transition temperature (Tg) satisfy the ranges described above. Examples of the polyamide resin include those which contain a component unit derived from a diamine and a component unit derived from an aliphatic dicarboxylic acid having 8 or less carbon atoms; and those which contain a component unit derived from an aromatic dicarboxylic acid and a component unit derived from an aliphatic diamine. Among these, a polyamide resin that contains a component unit derived from an aromatic dicarboxylic acid and a component unit derived from an aliphatic diamine is preferable. Such a polyamide resin can be the same as the polyamide resin (A) described above. From the viewpoint of obtaining good welding strength, the polyamide resin (A) contained in the polyamide resin composition of the present invention is preferably the same as the polyamide resin contained in the light-absorbing resin composition.

The resin component contained in the light-absorbing resin composition and the resin component contained in the polyamide resin composition of the present invention are preferably 90 mass % or more common.

4-1-2. Light-Absorbing Pigment

The light-absorbing pigment is a pigment that has an absorption wavelength in the wavelength range of the irradiating laser light, that is, in the wavelength range of 800 to 1064 nm. Such a light-absorbing pigment absorbs laser light, generates heat, and fuses the thermoplastic resin. This heat also fuses the resin component contained in the first molded body and thus enables welding.

The light-absorbing pigment may be an inorganic pigment or an organic pigment. Examples of the inorganic pigment include black pigments such as carbon black (for example, acetylene black, lamp black, thermal black, furnace black, channel black, and Ketjen black); red pigments such as iron oxide red; orange pigments such as molybdate orange; and white pigments such as titanium oxide. Examples of the organic pigments include yellow pigments, orange pigments, red pigments, blue pigments, and green pigments. Among these, inorganic pigments are preferable since the masking power thereof is generally strong, and black pigments are more preferable.

From the viewpoint of improving dispersibility, the light-absorbing pigment is preferably added as a master batch during manufacture of the light-absorbing resin composition. Examples of the master batch of carbon black include PA-0896A (master batch with a carbon black content of 50 mass %) produced by NIKKO BICS CO., LTD.

One light-absorbing pigment may be used alone or two or more light-absorbing pigments may be used in combination. The light-absorbing pigment content is preferably 0.01 to 1 part by mass relative to the total of 100 parts by mass of the resin component.

4-1-3. Other Components

The light-absorbing resin composition may further contain a fibrous filler, a nucleating agent, and the like if needed.

The fibrous filler may be the same as the fibrous filler (D) described above. In particular, the fibrous filler is preferably glass fibers. The average fiber length and the aspect ratio of the fibrous filler can the same as those described above. The nucleating agent can also be the same as the nucleating agent (E) described above.

4-2. Method for Manufacturing Laser-Welded Body

Next, a method for manufacturing a laser-welded body of the present invention is described.

The method for manufacturing a laser-welded body of the present invention includes 1) a step of obtaining a molded body (first molded body) of the polyamide resin composition of the present invention, 2) a step of obtaining a molded body (second molded body) of the aforementioned light-absorbing resin composition, and 3) a step of placing the first molded body and the second molded body on top of each other and performing laser light irradiation through the first molded body so as to weld the first molded body and the second molded body.

Regarding Steps 1) and 2)

In the step 1), the polyamide resin composition of the present invention is molded to obtain a molded body (first molded body). In the step 2), the aforementioned light-absorbing resin composition may be molded to obtain a molded body (second molded body), or a commercially available product may be used. The molding method is the same as the molding method in "3. Molded body".

The shapes of the first molded body and the second molded body are not particularly limited; however, because the molded bodies are joined with each other by laser welding, the molded bodies usually have at least surfaces (flat surfaces or curved surfaces) that enable surface contact. In laser welding, the laser light that has transmitted through the first molded body which is a light-transmitting resin member is absorbed by the second molded body which is a light-absorbing resin member and causes fusion, thereby welding the two members. The first molded body obtained by molding the polyamide resin composition of the present invention has a high laser light transmittance despite incorporation of the fibrous filler (D); thus, the first molded body is preferably used as the transmitting resin component in the laser welding method.

The thickness of the first molded body (the thickness in the laser transmitting direction in the portion where the laser light transmits) can be set as appropriate by considering the usage, the composition of the polyamide resin composition, etc., and is, for example, 5 mm or less and is preferably 4 mm or less.

Regarding Step 3)

The first molded body and the second molded body are placed on top of each other and laser light irradiation is performed through the first molded body so as to weld the first molded body and the second molded body.

Specifically, the welding sites of the first molded body and the second molded body are brought into contact with each other. Here, the welding sites of the first molded body and the second molded body are preferably in surface-contact. The surface contact may be contact between flat surfaces or curved surfaces, or may be contact between a flat surface and a curved surface.

Next, the laser light irradiation is performed through the first molded body which is a light-transmitting resin member. The laser light irradiation is preferably performed at an angle of 85 to 95° with respect to the welding surface from the viewpoint of efficiently and easily deliver the laser light to the welding surfaces. In addition, if needed, a lens system may be used to focus the laser light on the interface between the first molded body and the second molded body. The focused beam transmits through the inside of the first molded body, is absorbed near the surface of the second molded body, generates heat, and causes fusion. Next, this heat is transmitted to and fuses the first molded body through thermal conduction, thereby forming a fusion pool at the interface between these bodies. The fusion pool is cooled and solidified and turns into a welded zone (joined zone).

The laser light source used can be selected according to the light of the light-absorbing pigment. For example, a laser light source having a wavelength of 800 to 1064 nm is preferable, and, for example, a semiconductor laser can be used.

The laser-welded body obtained by laser-welding the first molded body and the second molded body as such has high welding strength (joint strength). The laser-welded body of the present invention includes a finished product or component, and a member that constitutes a part thereof.

(Laser-Welded Body)

The obtained laser-welded body has good mechanical strength and high welding strength, and has less damage on the resin caused by laser light irradiation. Thus, the obtained laser-welded body can be applied to various usages, for example, various preservation containers, electric/electronic appliance parts, office automation (OA) machinery parts, home electric appliance parts, mechanical mechanism parts, automobile mechanism parts, etc. In particular, the obtained laser-welded body is preferable for use in food containers, drug containers, oil/fat product containers, automobile hollow parts (various tanks, intake manifold parts, temperature adjusting valve parts, thermostat cases, camera casings, etc.), automobile electrical components (various control units, ignition coil parts, etc.), motor parts, various sensor parts, connector parts, switch parts, breaker parts, relay parts, coil parts, transformer parts, lamp parts, etc.

EXAMPLES

The present invention is described below with reference to examples. The interpretation of the scope of the present invention is not limited by these examples.

1. Preparation of Materials (1) Polyamide Resin (A)
<Preparation of Polyamide Resin (A-1)>

Into an autoclave having an inner capacity or 13.6 L, 2800 g (24.1 mol) of 1,6-hexanediamine, 2774 g (16.7 mol) of terephthalic acid, 1196 g (7.2 mol) of isophthalic acid, 36.6 g (0.30 mol) of benzoic acid, 5.7 g of sodium phosphinate monohydrate, and 545 g of distilled water were charged, followed by nitrogen purging. Stirring was started at 190° C., and the inner temperature was elevated up to 250° C. over a period of 3 hours. During this process, the inner pressure of the autoclave was elevated up to 3.03 MPa. After the reaction was continued under the same conditions for 1 hour, atmospheric discharge was performed from a spray nozzle installed in the lower part of the autoclave, and the low-order condensation product was discharged. Subsequently, the low-order condensation product was cooled to room temperature, and the low-order condensation product was crushed to a particle diameter of 1.5 mm or less with a crusher and was dried at 110° C. for 24 hours. The obtained low-order condensation product had a moisture content of 4100 ppm and an intrinsic viscosity [η] of 0.15 dl/g.

Next, this low-order condensation product was placed in a shelf solid-phase polymerization apparatus, and after nitrogen purging, the temperature was elevated to 180° C. over a period of about 1 hour and 30 minutes. Subsequently, the reaction was conducted for 1 hour and 30 minutes, and the temperature was decreased to room temperature. The obtained prepolymer had an intrinsic viscosity [η] of 0.20 dl/g.

Subsequently, the obtained prepolymer was melt-polymerized in a twin-screw extruder having a screw diameter of 30 mm and L/D=36 at a barrel set temperature of 330° C., a screw rotation rate of 200 rpm, and a resin feed rate of 6 kg/h so as to obtain a polyamide resin (A-1).

The obtained polyamide resin (A-1) had an intrinsic viscosity of 1.0 dl/g, a melting point (Tm) of 330° C., a glass transition temperature (Tg) of 125° C., and a terminal amino group amount of 30 mmol/kg.

<Preparation of Polyamide Resin (A-2)>

Into an autoclave having an inner capacity or 13.6 L, 2800 g (24.1 mol) of 1,6-hexanediamine, 2176 g (13.1 mol) of terephthalic acid, 1578 g (10.8 mol) of adipic acid, 36.6 g (0.30 mol) of benzoic acid, 5.7 g of sodium phosphinate monohydrate, and 554 g of distilled water were charged, followed by nitrogen purging. Stirring was started at 190° C., and the inner temperature was elevated up to 250° C. over a period of 3 hours. During this process, the inner pressure of the autoclave was elevated up to 3.01 MPa. After the reaction was continued under the same conditions for 1 hour, atmospheric discharge was performed from a spray nozzle installed in the lower part of the autoclave, and the low-order condensation product was discharged. Subsequently, the low-order condensation product was cooled to room temperature, was crushed to a particle diameter of 1.5 mm or less with a crusher, and was dried at 110° C. for 24 hours. The obtained low-order condensation product had a moisture content of 3600 ppm and an intrinsic viscosity [η] of 0.14 dl/g.

Next, this low-order condensation product was placed in a shelf solid-phase polymerization apparatus, and after nitrogen purging, the temperature was elevated to 220° C. over a period of about 1 hour and 30 minutes. Subsequently, the reaction was conducted for 1 hour, and the temperature was decreased to room temperature. The obtained prepolymer had an intrinsic viscosity [η] of 0.48 dl/g.

Subsequently, the obtained prepolymer was melt-polymerized in a twin-screw extruder having a screw diameter of 30 mm and L/D=36 at a barrel set temperature of 330° C., a screw rotation rate of 200 rpm, and a resin feed rate of 6 kg/h so as to obtain a polyamide resin (A-2).

The obtained polyamide resin (A-2) had an intrinsic viscosity [η] of 1.0 dl/g, a melting point (Tm) of 310° C., a glass transition temperature (Tg) of 85° C., and a terminal amino group amount of 45 mmol/kg.

<Preparation of Polyamide Resin (A-3)>

A polyamide resin (A-3) was obtained as in the preparation of the polyamide resin (A-1) except that the raw materials were changed to 2905 g (25.0 mol) of 1,6-hexanediamine, 2475 g (14.9 mol) of terephthalic acid, 1461 g (10.0 mol) of adipic acid, 73.2 g (0.60 mol) of benzoic acid, and 5.7 g of sodium phosphinate monohydrate.

The obtained polyamide resin (A-3) had an intrinsic viscosity [η] of 0.8 dl/g, a terminal amino group amount of 110 mmol/kg, a melting point (Tm) of 320° C., and a glass transition temperature (Tg) of 95° C.

<Preparation of Polyamide Resin (A-4)>

Into a 1 L reactor, 1312 g (11.3 mol) of 1,6-hexanediamine, 1312 g (11.3 mol) of 2-methyl-1,5-pentanediamine, 3655 g (22.0 mol) of terephthalic acid, 5.5 g ($5.2 \times 10^{-2}$ mol) of sodium hypophosphite serving as a catalyst, and 640 ml of ion exchange water were charged, and after nitrogen purging, the reaction was conducted under the conditions of 250° C. and 35 kg/cm². The molar ratio of 1,6-hexanediamine to 2-methyl-1,5-pentanediamine was 50:50. After 1 hour, the reaction products produced in the reactor were discharged to a receiver connected to the reactor and having a pressure set to about 10 kg/cm² lower, and a prepolymer having an intrinsic viscosity [η] of 0.15 dl/g was obtained.

Subsequently, the obtained prepolymer was dried, and then melt-polymerized in a twin-screw extruder having a cylinder set temperature of 330° C. so as to obtain a polyamide resin (A-4).

The obtained polyamide resin (A-4) had an intrinsic viscosity [η] of 1.0 dl/g, a melting point (Tm) of 300° C., a glass transition temperature (Tg) of 140° C., and a terminal amino group amount of 45 mmol/kg.

<Preparation of Polyamide Resin (A-5)>

Into an autoclave having an inner capacity of 20 L, 4385 g (27.7 mol) of a mixture of 1,9-nonanediamine and 2-methyl-1,8-octanediamine [1,9-nonanediamine:2-methyl-1,8-octanediamine=80:20 (molar ratio)], 4537.7 g (27.3 mol) of terephthalic acid, 9.12 g (0.1 mass % relative to the total mass of the raw materials) of sodium phosphinate monohydrate, and 2.5 L of distilled water were charged, followed by nitrogen purging. Stirring was conducted at 100° C. for 30 minutes, and the inner temperature of the autoclave was elevated up to 220° C. over a period of 2 hours. During this process, the pressure inside the autoclave was elevated up to 2 MPa. After the reaction was continued under the same conditions for 2 hours, the temperature was elevated to 230° C., and then the reaction was conducted while the temperature was kept at 230° C. for 2 hours and the pressure was maintained at 2 MPa by gradually discharging the water vapor. Next, the pressure was decreased to 1 MPa over a period of 30 minutes, the reaction was conducted for one more hour, and a prepolymer having an intrinsic viscosity [η] of 0.15 dl/g was obtained.

The obtained prepolymer was dried at 100° C. at a reduced pressure for 12 hours, and then crushed to a particle diameter of 2 mm or less. The crushed prepolymer was solid-phase polymerized at 230° C. and 13 Pa (0.1 mmHg) for 10 hours to obtain a polyamide resin (A-5).

The obtained polyamide resin (A-5) had an intrinsic viscosity [η] of 1.2 dl/g, a melting point (Tm) of 300° C., a glass transition temperature (Tg) of 120° C., and a terminal amino group amount of 80 mmol/kg.

(2) Polyamide Resin (B)

<Preparation of Polyamide Resin (B-1)>

Into an autoclave having an inner capacity or 13.6 L, 2800 g (24.1 mol) of 1,6-hexanediamine, 1390 g (8.4 mol) of terephthalic acid, 2581 g (15.5 mol) of isophthalic acid, 109.5 g (0.9 mol) of benzoic acid, 5.7 g of sodium phosphinate monohydrate, and 545 g of distilled water were charged, followed by nitrogen purging. Stirring was started at 190° C., and the inner temperature was elevated up to 250° C. over a period of 3 hours. During this process, the inner pressure of the autoclave was elevated up to 3.02 MPa. After the reaction was continued under the same conditions for 1 hour, atmospheric discharge was performed from a spray nozzle installed in the lower part of the autoclave, and the low-order condensation product was discharged. Subsequently, the low-order condensation product was cooled to room temperature, was crushed to a particle diameter of 1.5 mm or less with a crusher, and was dried at 110° C. for 24 hours. The obtained low-order condensation product had a moisture content of 3000 ppm and an intrinsic viscosity [η] of 0.14 dl/g.

Subsequently, this low-order condensation product was melt-polymerized in a twin-screw extruder having a screw diameter of 30 mm and L/D=36 at a barrel set temperature of 330° C., a screw rotation rate of 200 rpm, and a resin feed rate of 6 kg/h so as to obtain a polyamide resin (B-1).

The obtained polyamide resin (B-1) had an intrinsic viscosity [η] of 0.68 dl/g, no measured melting point (Tm), a glass transition temperature (Tg) of 125° C., and a heat of fusion (ΔH) of 0 J/g.

(3) Comparative Polyamide Resin

<Polyamide Resin (a-1)>

A nylon resin produced by Toray Industries Inc., AMILAN CM3001-N(66 nylon, intrinsic viscosity [η]: 1.6 dl/g, melting point (Tm): 262° C., glass transition temperature (Tg): 53° C.)

<Polyamide Resin (a-2)>

A metaxylylene adipamide resin (produced by Mitsubishi Engineering-Plastics Corporation, polyamide MXD6 Reney "#6002", melting point (Tm): 243° C., heat of fusion (ΔH): 52 J/mg)

The intrinsic viscosity [η], the melting point (Tm), the glass transition temperature (Tg), and the terminal amino group amount of the obtained polyamide resins (A-1) to (A-5) and (B-1) were measured by the following methods.

[Intrinsic Viscosity [η]]

In compliance with JIS K 6810-1977, 0.5 g of the polyamide resin was dissolved in 50 ml of a 96.5% sulfuric acid solution to prepare a sample solution. The obtained sample solution outflow time in seconds was measured with a Ubbelohde viscometer under the condition of 25±0.05° C. The measured result was substituted into the following equation to calculate the intrinsic viscosity [η] of the polyamide resin.

$$[\eta] = \eta SP/[C(1+0.205\eta SP)]$$

$$\eta SP = (t-t0)/t0$$

[η]: Intrinsic viscosity (dl/g)
ηSP: Specific viscosity
C: Sample concentration (g/dl)
t: The sample solution outflow time in seconds (sec)
t0: The blank sulfuric acid outflow time in seconds (sec)

[Melting Point (Tm), Glass Transition Temperature (Tg), and Heat of Fusion (ΔH)]

The melting point (Tm) and the glass transition temperature (Tg) of the polyamide resin were measured with a differential scanning calorimeter (model DSC220C produced by Seiko Instruments Inc.). Specifically, about 5 mg of the polyamide resin was sealed in an aluminum pan for measurement, and was heated from room temperature to 350° C. at 10° C./min. In order to completely fuse the resin, the resin was kept at 350° C. for 5 minutes, and then cooled at 10° C./min down to 30° C. After leaving the resin at 30° C. for 5 minutes, the resin was heated for the second time at 10° C./min up to 350° C. The endothermic peak temperature (° C.) during the second heating was assumed to be the melting point (Tm) of the polyamide resin, and the inflection point corresponding to glass transition was assumed to be the glass transition temperature (Tg). The heat of fusion (ΔH) was determined from the area of the exothermic peak of crystallization during the first temperature elevation cycle in compliance with JIS K 7122.

[Terminal Amino Group Amount]

In 35 mL of phenol, 1 g of the polyamide resin was dissolved, and 2 mL of methanol was mixed thereto to obtain a sample solution. Next, the sample solution was titrated with a 0.01N HCl aqueous solution using thymol blue as the indicator from blue to yellow so as to measure the amount of terminal amino groups ([$NH_2$], unit: mmol/kg).

The compositions and the properties of the polyamide resins (A-1) to (A-5) and (B-1), and the comparative polyamide resins (a-1) and (a-2) are summarized in Table 1. A FIGURE in the parentheses in Table 1 indicates mol % of the diamine or dicarboxylic acid when the total amount of the diamine or the total amount of the dicarboxylic acid was assumed to be 100 mol %.

(Average Fiber Length and Average Fiber Diameter)

The fiber length and the fiber diameter of arbitrary selected 100 fibers among the glass fibers were measured by using a scanning electron microscope (SEM) at a magnification of 50×. Then, the obtained average value of the fiber lengths was assumed to be the average fiber length, and the obtained average value of the fiber diameters was assumed to be the average fiber diameter. The aspect ratio was assumed to be average fiber length/average fiber diameter.

(6) Other Component (E)

Talc (nucleating agent): 1.6 μm in average particle diameter

TABLE 1

| Polyamide resin | Diamine (unit: mol) | | | | | Dicarboxylic acid (unit: mol) | | |
|---|---|---|---|---|---|---|---|---|
| | Aromatic | Aliphatic | | | | Aromatic | | Aliphatic |
| | Metaxylylene-diamine | 1,6-Hexane-diamine | 1,9-Nonane-diamine | 2-Methyl-1,5-pentane-diamine | 2-Methyl-1,8-octane-diamine | Terephthalic acid | Isophthalic acid | Adipic acid |
| A-1 | | 24.1 (100) | | | | 16.7 (70) | 7.2 (30) | |
| A-2 | | 24.1 (100) | | | | 13.1 (54.8) | | 10.8 (45.2) |
| A-3 | | 25 (100) | | | | 14.9 (60) | | 10 (40) |
| A-4 | | 11.3 (50) | | 11.3 (50) | | 22 (100) | | |
| A-5 | | | 22.2 (80) | | 5.5 (20) | 27.3 (100) | | |
| B-1 | | 24.1 (100) | | | | 8.4 (35) | 15.5 (65) | |
| a-1 | | (100) | | | | | | (100) |
| a-2 | (100) | | | | | | | (100) |

| Polyamide resin | Terminal capping agent Benzoic acid (mol) | Properties | | | | |
|---|---|---|---|---|---|---|
| | | Intrinsic viscosity (dl/g) | Tm (° C.) | Tg (° C.) | Terminal amino group amount (mmol/kg) | ΔH (J/g) |
| A-1 | 0.3 | 1.00 | 330 | 125 | 30 | >5 |
| A-2 | 0.3 | 1.00 | 310 | 85 | 45 | >5 |
| A-3 | 0.6 | 0.80 | 320 | 95 | 110 | >5 |
| A-4 | — | 1.00 | 300 | 140 | 45 | >5 |
| A-5 | — | 1.20 | 300 | 120 | 80 | >5 |
| B-1 | 0.9 | 0.68 | Undetected | 125 | Unmeasured | 0 |
| a-1 | — | 1.60 | 262 | 53 | Unmeasured | — |
| a-2 | — | | 243 | | Unmeasured | 52 |

(4) Light-Transmitting Pigment (C)

8701H: e-BIND LTW-8701H (master batch of polyamide 66 and a light-transmitting pigment (light-transmitting pigment: 50 mass %)) produced by Orient Chemical Industries Co., Ltd.

Comparative compound (pigment that does not have laser light-transmitting properties): Nubian Black TH-827 produced by Orient Chemical Industries Co., Ltd.

(5) Fibrous Filler (D)

Glass fibers (GF): ECS03T-747H produced by Nippon Electric Glass Co., Ltd., average fiber diameter: 9.5 to 10.5 μm, cut length: 3 mm The average fiber length and the average fiber diameter of the glass fibers were measured as follows.

2. Preparation and Evaluation of Polyamide Resin Composition

Examples 1 to 10, Reference Example 1, and Comparative Examples 1 and 2

(Preparation of Polyamide Resin Compositions (PA1-1) to (PA1-13))

A polyamide resin, a light-transmitting pigment (C), a fibrous filler (D), and other components (E) were blended in a tumbler blender at a compositional ratio indicated in Table 2, and then melt-kneaded in a twin-screw extruder (TEX30α produced by The Japan Steel Works, LTD.) at a cylinder temperature of (melting point (Tm) of polyamide resin (A)+15°) C. The addition of the light-transmitting pigment (C) was conducted in a master batch state, and the addition amount of the master batch was set to a value indicated in Table 2. Subsequently, the melt-kneaded resin was extruded into strands, and cooled in a water vessel. Subsequently, the strands were drawn and cut with a pelletizer to obtain a pellet-shaped polyamide resin composition (light-transmitting resin composition).

Comparative Example 5

A polyamide resin composition was obtained as in Example 3 except that the light-transmitting pigment (C) was changed to the aforementioned comparative compound (Nubian Black TH-827 produced by Orient Chemical Industries Co., Ltd.).

The melting point (Tm), the glass transition temperature (Tg), the laser light transmittance, the deflection temperature under load, the tensile strength, and the corrected heat of fusion ($\Delta H_R$) of the obtained polyamide resin compositions (light-transmitting resin compositions except for Comparative Example 5) were measured by the following methods.

[Melting Point (Tm) and Glass Transition Temperature (Tg)]

The melting point (Tm) and the glass transition temperature (Tg) of the obtained polyamide resin compositions were measured by the same methods as those described above.

[Laser Light Transmittance]

The obtained polyamide resin composition was molded by using the following injection molding machine under the following molding conditions so as to obtain a test piece having a length of 125 mm, a width of 13 mm, and a thickness of 1.6 mm.

Molding machine: EC75N-2(A) produced by Toshiba Machine Co., Ltd.

Molding machine cylinder temperature: Melting point (Tm) of polyamide resin composition+10° C.

Die temperature: Glass transition temperature (Tg) of polyamide resin composition−5° C.

Injection set rate: 50 mm/sec

The same applies to the following measurement.

The laser light transmittance of the obtained test piece at a wavelength of 940 nm was measured by using a power meter F300-SH produced by Ophir Optronics Solutions Ltd.

[Deflection Temperature Under Load]

A test piece having a thickness of 3.2 mm was obtained by using the following injection molding machine under the following molding conditions.

Molding machine: TUPARL TR40S3A produced by Sodick Plustech Co., Ltd.

Molding machine cylinder temperature: Melting point (Tm) of polyamide resin composition+15° C.

Die temperature: Glass transition temperature (Tg) of polyamide resin composition+20° C.

Next, the obtained test piece was loaded onto a load deflection tester, the span was set to 100 mm, and a pressure of 1.8 MPa was applied while the temperature was increased from 35° C. at a temperature elevation rate of 120° C./hr, and the temperature at which the amount of deflection reached 0.254 mm was assumed to be the "deflection temperature under load".

[Tensile Strength]

The obtained polyamide resin composition was molded by using the following injection molding machine under the following molding conditions so as to obtain an ASTM dumbbell-shaped test piece Type I having a thickness of 3.2 mm.

(Molding Conditions)

Molding machine: SG50M3 produced by Sumitomo Heavy Industries, Ltd.

Molding machine cylinder temperature: Melting point (Tm) of polyamide resin composition+10° C.

Die temperature: 120° C.

Injection set rate: 60 mm/sec

The obtained test piece was left in a nitrogen atmosphere at a temperature of 23° C. for 24 hours. Next, in accordance with ASTM D638, a tensile test was conducted in an atmosphere at a temperature of 23° C. and a relative humidity of 50% to measure the tensile strength.

[Corrected Heat of Fusion ($\Delta H_R$)]

A test piece was obtained in the same way as the method for preparing a test piece for tensile strength. A 5 mg portion was sampled from the obtained test piece, and the heat of fusion ($\Delta H$) was calculated from the area of the exothermic peak in the first temperature elevation cycle involving a rate of 10° C./min by using a differential scanning calorimeter (model DSC220C produced by Seiko Instruments Inc.). The obtained heat of fusion ($\Delta H$) was divided by the ratio of the total mass of the components other than the fibrous filler (D) to the total mass of the polyamide resin composition so as to calculate the corrected heat of fusion ($\Delta H_R$).

The evaluation results of Examples 1 to 10, Reference Example 1, and Comparative Examples 1 and 2 are indicated in Table 2.

TABLE 2

| | | | | | Example | | | | | | |
|---|---|---|---|---|---|---|---|---|---|---|---|
| | | | | Unit | 1 | 2 | 3 | 4 | 5 | 6 | 7 |
| Polyamide resin composition No. | | | | — | PA1-1 | PA1-2 | PA1-3 | PA1-4 | PA1-5 | PA1-6 | PA1-7 |
| Composition | Polyamide resin (A) | | A-1 | Parts by mass | 83 | 63 | 64.5 | 63 | 60 | 48 | |
| | | | A-2 | | | | | | | | 68 |
| | | | A-3 | | | | | | | | |
| | | | A-4 | | | | | | | | |
| | | | A-5 | | | | | | | | |
| | (B) | | B-1 | Parts by mass | | 20 | | | | | |
| | | Comparative | a-1 | Parts by mass | | | | | | | |
| | | | a-2 | | | | | | | | |
| | Light-transmitting pigment (C) | | 8701H | Parts by mass | 2 | 2 | 0.5 | 2 | 5 | 2 | 2 |
| | Fibrous filler (D) | | GF | Parts by mass | 15 | 15 | 35 | 35 | 35 | 50 | 30 |
| | Other component (E) | | Talc | Parts by mass | 1 | 1 | 1 | 1 | 1 | 1 | 1 |

TABLE 2-continued

| Evaluation | | | | | | | | |
|---|---|---|---|---|---|---|---|---|
| Tm(° C.) | ° C. | 330 | 315 | 330 | 330 | 325 | 330 | 310 |
| Tg(° C.) | ° C. | 125 | 125 | 125 | 125 | 120 | 125 | 85 |
| Laser light transmittance | % | 51 | 48 | 45 | 44 | 38 | 33 | 37 |
| Deflection temperature under load | ° C. | 290 | 265 | 310 | 310 | 305 | 310 | 300 |
| Tensile strength | MPa | 140 | 120 | 250 | 250 | 245 | 300 | 170 |
| Corrected heat of fusion ($\Delta H_R$) | J/g | 48 | 36 | 51 | 47 | 43 | 40 | 54 |

| | | | | | Example | | Reference Example | Comparative Example | |
|---|---|---|---|---|---|---|---|---|---|
| | | | | Unit | 8 | 9 | 10 | 1 | 1 | 2 |
| Polyamide resin composition No. | | | | — | PA1-8 | PA1-9 | PA1-10 | PA1-11 | PA1-12 | PA1-13 |
| Composition | Polyamide resin | (A) | A-1 | Parts by mass | | | | | | |
| | | | A-2 | | 68 | | | | | |
| | | | A-3 | | | 63 | | | | |
| | | | A-4 | | | | 63 | | | |
| | | | A-5 | | | | | 63 | | |
| | | (B) | B-1 | Parts by mass | | | | | 63 | |
| | | Comparative | a-1 | Parts by mass | | | | | | 63 |
| | | | a-2 | | | | | | | 63 |
| | Light-transmitting pigment (C) | | 8701H | Parts by mass | 2 | 2 | 2 | 2 | 2 | 2 |
| | Fibrous filler (D) | | GF | Parts by mass | 30 | 35 | 35 | 35 | 35 | 35 |
| | Other component (E) | | Talc | Parts by mass | 1 | 1 | 1 | 1 | 1 | 1 |
| Evaluation | Tm(° C.) | | | ° C. | 320 | 300 | 300 | — | 260 | 240 |
| | Tg(° C.) | | | ° C. | 95 | 130 | 125 | 125 | 50 | 80 |
| | Laser light transmittance | | | % | 39 | 46 | 41 | 40 | 35 | 42 |
| | Deflection temperature under load | | | ° C. | 310 | 280 | 270 | 190 | 255 | 230 |
| | Tensile strength | | | MPa | 190 | 220 | 195 | 210 | 180 | 210 |
| | Corrected heat of fusion ($\Delta H_R$) | | | J/g | 57 | 41 | 58 | 0 | 94 | 75 |

As indicated in Table 2, it is found that the polyamide resin compositions of Examples 1 to 10 all have higher deflection temperatures under load and higher heat resistance than the polyamide resin compositions of Comparative Examples 1 and 2 and Reference Example 1. In addition, it is found that the polyamide resin compositions of Examples 4, 9, and 10 all have laser transmittances and tensile strengths comparable to or higher than the polyamide resin compositions of Comparative Examples 1 and 2 and Reference Example 1.

In particular, it is found that appropriately decreasing the crystallinity of the polyamide resin (A) (adding isophthalic acid or adding a branched aliphatic diamine) appropriately decreases the corrected heat of fusion ($\Delta H_R$) of the polyamide resin composition and tends to further increase the welding strength (comparison of Examples 4, 9, and 10).

In addition, it is found that appropriately increasing (but not excessively increasing) the fibrous filler (D) content in the polyamide resin composition decreases the corrected heat of fusion ($\Delta H_R$) of the polyamide resin composition and tends to further increase the tensile strength (comparison of Examples 1, 4, and 6).

In addition, it is found that increasing but not excessively increasing the light-transmitting pigment (C) content in the polyamide resin composition decreases the corrected heat of fusion ($\Delta H_R$) of the polyamide resin composition and tends to further increase the welding strength (comparison of Examples 3 to 5).

Furthermore, the polyamide resin composition of Comparative Example 5 in which the comparative compound was used instead of the light-transmitting pigment (C) absorbed (did not transmit) the laser light and underwent heat generation and ignition. Thus, it was not possible to measure the laser light transmittance, and other measurements were also not performed.

3. Preparation and Evaluation of Welded Body

Examples 11 to 22, Reference Example 2, and Comparative Examples 3 and 4

(Preparation of Light-Absorbing Resin Compositions (PA2-1) to (PA2-9))

A polyamide resin, a light-absorbing pigment, a fibrous filler, and a nucleating agent were blended in a tumbler blender at a compositional ratio indicated in the lower part of Table 3, and then melt-kneaded in a twin-screw extruder (TEX30α produced by The Japan Steel Works, LTD.) at a cylinder temperature of (melting point (Tm) or polyamide resin (A')+15°) C. Subsequently, the melt-kneaded resin was extruded into strands, and cooled in a water vessel. Subsequently, the strands were drawn and cut with a pelletizer to obtain a pellet-shaped light-absorbing resin composition.

When preparing the light-absorbing resin compositions, the aforementioned polyamide resins (A-1) to (A-5), (B-1), (a-1), and (a-2) were used as the polyamide resin. Carbon black (MA600B produced by Mitsubishi Chemical Corporation) was used as the light-absorbing pigment. The aforementioned glass fibers were used as the fibrous filler. The aforementioned talc was used as the nucleating agent.

Then, the welding strength between the molded body of the polyamide resin composition (light-transmitting resin composition) in the upper part of Table 3 and the molded body of the light-absorbing resin composition in the lower part of Table 3 was measured by the following method.

[Welding Strength]
(Preparation of Molded Body)

The polyamide resin composition (light-transmitting resin composition) and the light-absorbing resin composition were each molded by using the following injection molding machine under the following molding conditions so as to obtain a first molded body (laser light-transmitting molded body) and a second molded body (laser light-absorbing molded body) each having a length of 125 mm, a width of 13 mm, and a thickness of 1.6 mm.

Molding machine: EC75N-2(A) produced by Toshiba Machine Co., Ltd.

Molding machine cylinder temperature: Melting point (Tm) of polyamide resin+10° C.

Die temperature: Glass transition temperature (Tg) of polyamide resin−5° C.

Injection set rate: 50 mm/sec (Manufacturing Laser-Welded Body)

FIG. 1 is a schematic view illustrating a method for measuring the welding strength. As illustrated in FIG. 1, a lengthwise one end portion of the obtained first molded body (light-transmitting resin member) and a lengthwise another end portion of the obtained second molded body (light-absorbing resin member) were placed on top of each other so that the overlap width (the lengthwise width of the molded body) was 1 cm, and the overlap portion was irradiated with laser light with the center of irradiation being a portion 0.5 mm from the end portion of the first molded body (light-transmitting resin member) and the range of irradiation being ±10 mm in the lengthwise direction of the molded body. The laser light irradiation conditions were as follows:

Tester: fd-200 produced by Fine Device Co., Ltd.
Presser pressure: 0.5 MPa
Laser beam size: 2 mmϕ
Scanning distance: 10 mm
Total energy reaching second molded body: 12 J (Measurement of Welding Strength)

The obtained laser-welded body was subjected to a tensile test in compliance with JIS K 6301-2 in an atmosphere at a temperature of 23° C. and a relative humidity of 50% to measure the tensile strength. The obtained tensile strength was assumed to be the "welding strength".

The evaluation results of Examples 11 to 22, Reference Example 2, and Comparative Examples 3 and 4 are indicated in Table 3.

TABLE 3

| | | | | Unit | Example 11 PA1-1 | Example 12 PA1-2 | Example 13 PA1-3 | Example 14 PA1-4 | Example 15 PA1-5 | Example 16 PA1-6 | Example 17 PA1-4 | Example 18 PA1-7 |
|---|---|---|---|---|---|---|---|---|---|---|---|---|
| | | No. | | — | | | | | | | | |
| Light-transmitting resin composition (polyamide resin composition of the present invention) | Polyamide resin (A) | | A-1 | Parts by mass | 83 | 63 | 64.5 | 63 | 60 | 48 | 63 | |
| | | | A-2 | | | | | | | | | 68 |
| | | | A-3 | | | | | | | | | |
| | | | A-4 | | | | | | | | | |
| | | | A-5 | | | | | | | | | |
| | (B) | | B-1 | Parts by mass | | 20 | | | | | | |
| | Comparative | | a-1 | Parts by mass | | | | | | | | |
| | | | a-2 | | | | | | | | | |
| | Light-transmitting pigment (C) | | 8701H | Parts by mass | 2 | 2 | 0.5 | 2 | 5 | 2 | 2 | 2 |
| | Fibrous filler (D) | | GF | Parts by mass | 15 | 15 | 35 | 35 | 35 | 50 | 35 | 30 |
| | Other component (E) | Talc | | Parts by mass | 1 | 1 | 1 | 1 | 1 | 1 | 1 | 1 |
| | Tm(° C.) | | | ° C. | 330 | 315 | 330 | 330 | 325 | 330 | 330 | 310 |
| | Tg(° C.) | | | ° C. | 125 | 125 | 125 | 125 | 120 | 125 | 125 | 85 |
| | Laser light transmittance | | | % | 51 | 48 | 45 | 44 | 38 | 33 | 44 | 37 |
| | Deflection temperature under load | | | ° C. | 290 | 265 | 310 | 310 | 305 | 310 | 310 | 300 |
| | Tensile strength | | | MPa | 140 | 120 | 250 | 250 | 245 | 300 | 250 | 170 |
| | Corrected heat of fusion ($\Delta H_R$) | | | J/g | 48 | 36 | 51 | 47 | 43 | 40 | 47 | 54 |
| Light-absorbing resin composition | No. | | | — | PA2-1 | PA2-1 | PA2-1 | PA2-1 | PA2-1 | PA2-1 | PA2-2 | PA2-1 |
| | Polyamide resin | | A-1 | Parts by mass | 64.5 | 64.5 | 64.5 | 64.5 | 64.5 | 64.5 | | 64.5 |
| | | | A-2 | | | | | | | | 69.5 | |
| | | | A-3 | | | | | | | | | |
| | | | A-4 | | | | | | | | | |
| | | | A-5 | | | | | | | | | |
| | | | B-1 | Parts by mass | | | | | | | | |
| | | | a-1 | Parts by mass | | | | | | | | |
| | | | a-2 | | | | | | | | | |
| | Light-transmitting pigment | | CB | Parts by mass | 0.5 | 0.5 | 0.5 | 0.5 | 0.5 | 0.5 | 0.5 | 0.5 |
| | Fibrous filler | | GF | Parts by mass | 35 | 35 | 35 | 35 | 35 | 35 | 30 | 35 |
| | Other component | Talc | | Parts by mass | 1 | 1 | 1 | 1 | 1 | 1 | 1 | 1 |
| Welded body | Welding strength | | | MPa | 50 | 49 | 51 | 53 | 48 | 42 | 54 | 43 |

TABLE 3-continued

|  |  |  | Unit | Example 19 PA1-7 | Example 20 PA1-8 | Example 21 PA1-9 | Example 22 PA1-10 | Reference Example 2 PA1-11 | Comparative Example 3 PA1-12 | Comparative Example 4 PA1-13 |
|---|---|---|---|---|---|---|---|---|---|---|
| No. |  |  | — |  |  |  |  |  |  |  |
| Light-transmitting resin composition (polyamide resin composition of the present invention) | Polyamide resin (A) | A-1 | Parts by mass | 68 |  |  |  |  |  |  |
|  |  | A-2 |  |  |  |  |  |  |  |  |
|  |  | A-3 |  |  | 68 |  |  |  |  |  |
|  |  | A-4 |  |  |  | 63 |  |  |  |  |
|  |  | A-5 |  |  |  |  | 63 |  |  |  |
|  | (B) | B-1 | Parts by mass |  |  |  |  | 63 |  |  |
|  | Comparative | a-1 | Parts by mass |  |  |  |  |  | 63 |  |
|  |  | a-2 |  |  |  |  |  |  |  | 63 |
|  | Light-transmitting pigment (C) | 8701H | Parts by mass | 2 | 2 | 2 | 2 | 2 | 2 | 2 |
|  | Fibrous filler (D) | GF | Parts by mass | 30 | 30 | 35 | 35 | 35 | 35 | 35 |
|  | Other component (E) | Talc | Parts by mass | 1 | 1 | 1 | 1 | 1 | 1 | 1 |
|  | Tm(° C.) |  | ° C. | 310 | 320 | 300 | 300 | — | 260 | 240 |
|  | Tg(° C.) |  | ° C. | 85 | 95 | 130 | 125 | 125 | 50 | 80 |
|  | Laser light transmittance |  | % | 37 | 39 | 46 | 41 | 40 | 35 | 42 |
|  | Deflection temperature under load |  | ° C. | 300 | 310 | 280 | 270 | 190 | 255 | 230 |
|  | Tensile strength |  | MPa | 170 | 190 | 220 | 195 | 210 | 180 | 210 |
|  | Corrected heat of fusion ($\Delta H_R$) |  | J/g | 54 | 57 | 41 | 58 | 0 | 94 | 75 |
| Light-absorbing resin composition | No. |  | — | PA2-3 | PA2-4 | PA2-5 | PA2-6 | PA2-7 | PA2-8 | PA2-9 |
|  | Polyamide resin | A-1 | Parts by mass | 64.5 |  |  |  |  |  |  |
|  |  | A-2 |  |  |  |  |  |  |  |  |
|  |  | A-3 |  |  | 64.5 |  |  |  |  |  |
|  |  | A-4 |  |  |  | 64.5 |  |  |  |  |
|  |  | A-5 |  |  |  |  | 64.5 |  |  |  |
|  |  | B-1 | Parts by mass |  |  |  |  | 64.5 |  |  |
|  |  | a-1 | Parts by mass |  |  |  |  |  | 64.5 |  |
|  |  | a-2 |  |  |  |  |  |  |  | 64.5 |
|  | Light-transmitting pigment | CB | Parts by mass | 0.5 | 0.5 | 0.5 | 0.5 | 0.5 | 0.5 | 0.5 |
|  | Fibrous filler | GF | Parts by mass | 30 | 30 | 35 | 35 | 35 | 35 | 35 |
|  | Other component | Talc | Parts by mass | 1 | 1 | 1 | 1 | 1 | 1 | 1 |
| Welded body | Welding strength |  | MPa | 45 | 44 | 47 | 43 | 45 | 26 | 32 |

As indicated in Table 3, it is found that the welded bodies of Examples 14, 17, 21, and 22 all have higher welding strengths than the welded bodies of Comparative Examples 3 and 4. In particular, it is found that appropriately decreasing (for example, decreasing to 54 J/g or less) the corrected heat of fusion ($\Delta H_R$) of the polyamide resin composition can increase the welding strength (comparison of Examples 14, 21, and 22).

In addition, it is found that increasing but not excessively increasing the fibrous filler (D) content in the polyamide resin composition can further increase the welding strength (comparison of Examples 11, 14, and 16).

In addition, it is found that increasing but not excessively increasing the light-transmitting pigment (C) content in the polyamide resin composition can further increase the welding strength (comparison of Examples 13 to 15).

The present application claims priority to Japanese Patent Application 2018-026310 filed on Feb. 16, 2018. The contents of the description and the drawings of this application are incorporated herein in their entirety.

INDUSTRIAL APPLICABILITY

According to the present invention, a polyamide resin composition that has high laser weldability that enables the composition to exhibit good welding strength during laser welding without degrading the laser light transmittance, as well as high mechanical strength and high heat resistance, and a method for manufacturing a welded body by using the polyamide resin composition can be provided.

The invention claimed is:
1. A polyamide resin composition, comprising:
   30 to 89.9 parts by mass of a polyamide resin (A) having a melting point of 300° C. or more as measured with a differential scanning calorimeter (DSC);
   0 to 45 parts by mass of a polyamide resin (B) having substantially no melting point as measured with a differential scanning calorimeter (DSC);
   0.1 to 5 parts by mass of a light-transmitting pigment (C); and
   10 to 55 parts by mass of a fibrous filler (D),
   wherein the total of components (A), (B), (C), and (D) is 100 parts by mass,
   wherein the polyamide resin (A) contains a dicarboxylic acid-derived component unit (a1) and a diamine-derived component unit (a2),
   the dicarboxylic acid-derived component unit (a1) contains 20 to 100 mol % of a component unit derived from terephthalic acid, and 0 to 80 mol % of at least one of a component unit derived from an aromatic dicarboxylic acid other than terephthalic acid and a component unit derived from an aliphatic dicarboxylic acid having

4 to 20 carbon atoms, relative to a total of 100 mol % of the dicarboxylic acid-derived component unit (a1), the diamine-derived component unit (a2) contains at least one of a component unit derived from an aliphatic diamine having 4 to 15 carbon atoms and a component unit derived from alicyclic diamine having 4 to 20 carbon atoms, wherein the light-transmitting pigment (C) does not have a local maximum value of an absorption wavelength within the wavelength range of 800 to 1064 nm, and wherein a mass ratio-corrected heat of fusion ($\Delta H_R$) of the polyamide resin composition is 10 to 70 J/g, wherein the $\Delta H_R$ being a value obtained by dividing a heat of fusion ($\Delta H$) of the polyamide resin composition by a ratio of the total mass of the components other than the fibrous filler (D) to a total mass of the polyamide resin composition, the heat of fusion ($\Delta H$) being measured with a differential scanning calorimeter (DSC), and a molded body of the polyamide resin composition has a laser light transmittance of 15% or more at a wavelength of 940 nm at a thickness of 1.6 mm.

2. The polyamide resin composition according to claim 1, wherein the diamine-derived component unit (a2) contains 50 to 100 mol % of the component unit derived from an aliphatic diamine having 4 to 15 carbon atoms relative to a total of 100 mol % of the diamine-derived component unit (a2).

3. The polyamide resin composition according to claim 2, wherein the component unit derived from an aliphatic diamine having 4 to 15 carbon atoms contains a component unit derived from a linear aliphatic diamine having 4 to 8 carbon atoms.

4. The polyamide resin composition according to claim 3, wherein the component unit derived from a linear aliphatic diamine having 4 to 8 carbon atoms is a component unit derived from an alkylenediamine having 4 to 8 carbon atoms.

5. The polyamide resin composition according to claim 4, wherein the component unit derived from an alkylenediamine having 4 to 8 carbon atoms is a component unit derived from 1,6-hexanediamine.

6. The polyamide resin composition according to claim 1, wherein the dicarboxylic acid-derived component unit (a1) further contains a component unit derived from isophthalic acid.

7. The polyamide resin composition according to claim 1, wherein the polyamide resin (B) contains a dicarboxylic acid-derived component unit (b1) and a diamine-derived component unit (b2), the dicarboxylic acid-derived component unit (b1) contains a component unit derived from isophthalic acid, and the diamine-derived component unit (b2) contains a component unit derived from an aliphatic diamine having 4 to 15 carbon atoms.

8. The polyamide resin composition according to claim 7, wherein the dicarboxylic acid-derived component unit (b1) may further contain a component unit derived from terephthalic acid, and a molar ratio of the component unit derived from isophthalic acid to the component unit derived from terephthalic acid is the component unit derived from isophthalic acid/the component unit derived from terephthalic acid=55/45 to 100/0 (molar ratio).

9. The polyamide resin composition according to claim 1, wherein the content of the fibrous filler (D) is 40 parts by mass or less relative to the total of 100 parts by mass of the components (A), (B), (C), and (D).

10. A light-transmitting resin composition for laser welding, comprising the polyamide resin composition according to claim 1.

11. A molded body obtained by molding the polyamide resin composition according to claim 1.

12. A method for manufacturing a laser-welded body, comprising:

molding the polyamide resin composition according to claim 1 to obtain a first molded body;

molding a light-absorbing resin composition that contains a thermoplastic resin and a light-absorbing pigment to obtain a second molded body; and placing the first molded body and the second molded body on top of each other and welding the first molded body and the second molded body by laser light irradiation through the first molded body.

13. The method for manufacturing a laser-welded body according to claim 12, wherein the thermoplastic resin is a polyamide resin.

14. The method for manufacturing a laser-welded body according to claim 13, wherein the polyamide resin is the same as the polyamide resin (A) contained in the polyamide resin composition.

* * * * *